US010682965B2

(12) United States Patent
Oba et al.

(10) Patent No.: US 10,682,965 B2
(45) Date of Patent: Jun. 16, 2020

(54) IMAGING UNIT SUPPORT APPARATUS

(71) Applicant: SONY CORPORATION, Tokyo (JP)

(72) Inventors: Eiji Oba, Tokyo (JP); Takahisa Hakoishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 69 days.

(21) Appl. No.: 16/085,639

(22) PCT Filed: Mar. 16, 2017

(86) PCT No.: PCT/JP2017/010682
§ 371 (c)(1),
(2) Date: Sep. 17, 2018

(87) PCT Pub. No.: WO2017/164067
PCT Pub. Date: Sep. 28, 2017

(65) Prior Publication Data
US 2019/0118728 A1  Apr. 25, 2019

(30) Foreign Application Priority Data

Mar. 24, 2016  (JP) .................................. 2016-059916

(51) Int. Cl.
*B60R 11/00* (2006.01)
*B60R 21/00* (2006.01)
(Continued)

(52) U.S. Cl.
CPC ................ *B60R 11/04* (2013.01); *B60R 1/00* (2013.01); *B60R 1/0605* (2013.01); *B60R 1/074* (2013.01);
(Continued)

(58) Field of Classification Search
CPC ....... B60R 11/04; B60R 1/0605; B60R 1/074; B60R 2300/20; B60R 1/00;
(Continued)

(56) References Cited

U.S. PATENT DOCUMENTS 4,685,649 A * 8/1987 McKay ............... F16F 15/0232
248/594
5,090,259 A * 2/1992 Shishido .............. G01N 21/954
324/220

(Continued)

FOREIGN PATENT DOCUMENTS

AT         448974 T    12/2009
CN      101443213 A     5/2009
(Continued)

OTHER PUBLICATIONS

Office Action of JP Patent Application No. 2016-059916, dated Oct. 29, 2019, 06 pages of Office Action and 04 pages of English Translation.

(Continued)

*Primary Examiner* — Philip P. Dang
(74) *Attorney, Agent, or Firm* — Chip Law Group

(57) ABSTRACT

A dynamically deployable side-view camera mount includes a support body that is movable between a deployed position and a retracted position. The support body in the retracted position allows the camera to at least partially include the angular range captured when the support body is in the deployed position.

21 Claims, 16 Drawing Sheets

(51) Int. Cl.
| | |
|---|---|
| *B60R 1/06* | (2006.01) |
| *B60R 11/04* | (2006.01) |
| *B60R 1/074* | (2006.01) |
| *B60R 1/00* | (2006.01) |
| *G06K 9/00* | (2006.01) |
| *H04N 5/225* | (2006.01) |
| *H04N 5/247* | (2006.01) |

(52) U.S. Cl.
CPC ....... *G06K 9/00805* (2013.01); *H04N 5/2253* (2013.01); *H04N 5/247* (2013.01); *B60R 2011/004* (2013.01); *B60R 2011/0045* (2013.01); *B60R 2011/0082* (2013.01); *B60R 2011/0087* (2013.01); *B60R 2011/0092* (2013.01); *B60R 2300/105* (2013.01)

(58) Field of Classification Search
CPC ....... B60R 2300/105; B60R 2011/0092; B60R 2011/0087; B60R 2011/0082; B60R 2011/0045; B60R 2011/004; B60R 1/08; B60R 2300/10; H04N 5/247; H04N 5/2253; H04N 7/181; H04N 5/2257; G06K 9/00805; G03B 17/561
See application file for complete search history.

(56) References Cited

U.S. PATENT DOCUMENTS

| | | | | |
|---|---|---|---|---|
| 5,173,726 | A * | 12/1992 | Burnham | G03B 5/04 396/149 |
| 5,263,796 | A * | 11/1993 | de Waal | F16L 1/201 248/49 |
| 5,992,796 | A * | 11/1999 | Smith | B64C 1/26 244/45 A |
| 6,446,987 | B2 | 9/2002 | Abraham | A45C 5/14 190/18 A |
| 6,690,268 | B2 * | 2/2004 | Schofield | B60R 1/04 340/438 |
| 6,746,029 | B2 * | 6/2004 | Chu | B62B 3/02 280/47.35 |
| 7,086,661 | B1 | 8/2006 | Osborn | B60D 1/60 150/166 |
| 7,092,477 | B2 * | 8/2006 | Wivagg | G21C 17/013 376/249 |
| 7,140,290 | B2 * | 11/2006 | Borgwarth | F41A 23/26 89/37.05 |
| 7,168,661 | B1 * | 1/2007 | Fox | B60D 1/36 104/20 |
| 7,231,868 | B2 * | 6/2007 | Soberanis | C12F 3/06 134/166 R |
| 7,427,220 | B2 * | 9/2008 | Dudek | B63C 11/42 440/1 |
| 8,457,830 | B2 * | 6/2013 | Goulding | B62D 57/024 701/26 |
| 8,647,258 | B2 * | 2/2014 | Aranyi | A61B 1/00174 600/104 |
| 8,944,705 | B1 * | 2/2015 | Matori | G03B 17/561 396/419 |
| 9,222,613 | B2 * | 12/2015 | Myers | F16M 11/14 |
| 9,283,898 | B2 * | 3/2016 | Azadi | B60R 7/06 |
| 9,321,410 | B2 * | 4/2016 | Hansen | B60R 11/04 |
| 9,326,668 | B1 * | 5/2016 | Berbee | A61B 1/227 |
| 9,426,342 | B1 * | 8/2016 | Bourque | H04N 5/2252 |
| 9,519,203 | B1 * | 12/2016 | Kennair, Jr. | G03B 17/561 |
| 9,522,595 | B2 * | 12/2016 | Rudakevych | B60K 17/043 |
| 9,619,863 | B2 * | 4/2017 | Muninder | G06T 3/4038 |
| 9,856,698 | B2 * | 1/2018 | Pollock | E21B 7/027 |
| 2004/0223078 | A1 * | 11/2004 | Zadok | F16M 13/04 348/375 |
| 2009/0231430 | A1 | 9/2009 | Buschmann et al. | |
| 2010/0010294 | A1 * | 1/2010 | Conlon | A61B 1/00082 600/104 |
| 2012/0099850 | A1 * | 4/2012 | Onishi | B60R 11/04 396/419 |
| 2013/0267964 | A1 * | 10/2013 | Rogers | A61B 1/00149 606/130 |
| 2014/0063245 | A1 | 3/2014 | Bowers et al. | |
| 2014/0118532 | A1 | 5/2014 | Bauer et al. | |
| 2014/0142382 | A1 * | 5/2014 | Bassan | A61B 1/00009 600/109 |
| 2014/0179997 | A1 * | 6/2014 | von Grunberg | A61B 1/00149 600/102 |
| 2014/0376119 | A1 | 12/2014 | Sobecki et al. | |
| 2015/0289755 | A1 * | 10/2015 | Voros | A61B 1/00096 600/109 |
| 2016/0006943 | A1 * | 1/2016 | Ratnakar | A61B 1/00009 348/36 |
| 2016/0073855 | A1 * | 3/2016 | Farr | A61B 1/00018 600/109 |
| 2016/0086524 | A1 * | 3/2016 | Canon | G09F 19/22 40/538 |
| 2017/0050568 | A1 | 2/2017 | Sobecki et al. | |
| 2017/0265953 | A1 * | 9/2017 | Fenech | A61B 90/50 |
| 2018/0111558 | A1 * | 4/2018 | Motomiya | B60R 1/074 |

FOREIGN PATENT DOCUMENTS

| | | |
|---|---|---|
| DE | 102006023103 A1 | 11/2007 |
| DE | 102012015395 B3 | 11/2013 |
| DE | 102014006961 A | 11/2015 |
| DE | 102014006961 A1 | 11/2015 |
| EP | 2018297 A1 | 1/2009 |
| JP | 06-064479 A | 3/1994 |
| JP | 10-287179 | 10/1998 |
| JP | 10-287179 A | 10/1998 |
| JP | 2003-165384 A | 6/2003 |
| JP | 2011-044396 A | 3/2011 |
| JP | 2011-184030 A | 9/2011 |
| JP | 2013-075608 A | 4/2013 |
| JP | 2014-033448 | 2/2014 |
| JP | 2014-033448 A | 2/2014 |
| JP | 2014-040233 | 3/2014 |
| JP | 2014-040233 A | 3/2014 |
| JP | 2014-061808 | 4/2014 |
| JP | 2014-061808 A | 4/2014 |
| WO | 2007/131651 A1 | 11/2007 |
| WO | 2014/199875 A1 | 12/2014 |

OTHER PUBLICATIONS

International Search Report and Written Opinion of PCT Application No. PCT/JP2017/010682, dated May 8, 2017, 12 pages of ISRWO.

Office Action for JP Patent Application No. 2016-059916, dated Apr. 7, 2020, 7 pages of Office Action and 7 pages of English Translation.

* cited by examiner

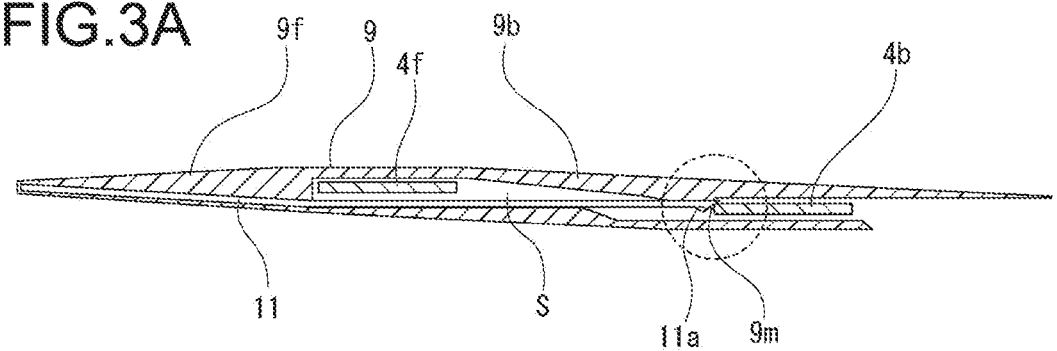
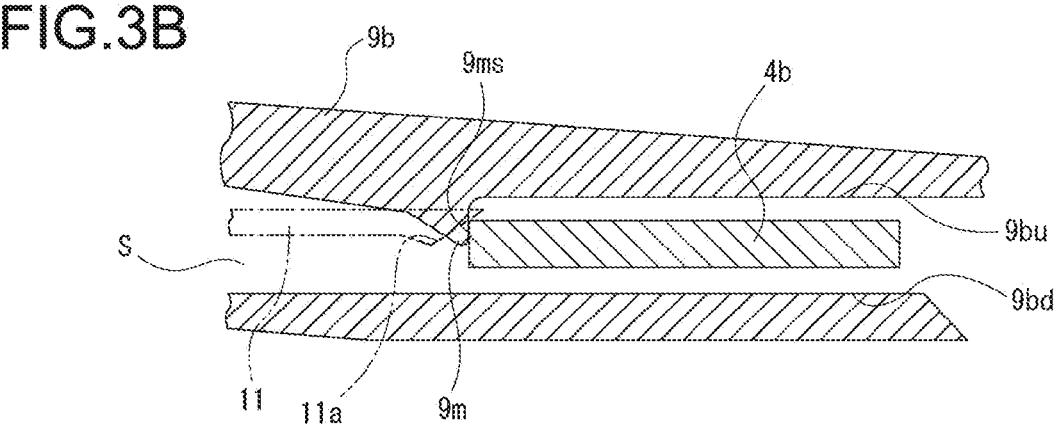
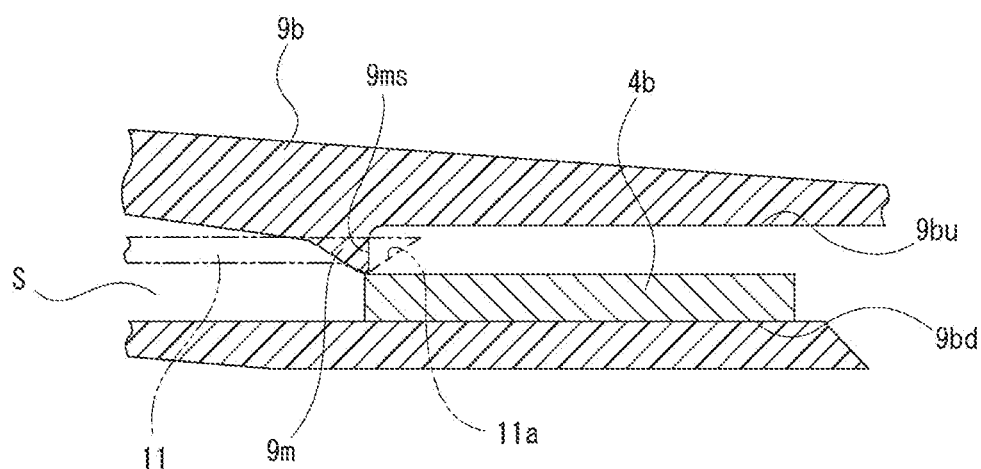
FIG.4

IMAGING UNIT SUPPORT APPARATUS

CROSS REFERENCE TO RELATED APPLICATIONS

This application is a U.S. National Phase of International Patent Application No. PCT/JP2017/010682 filed on Mar. 16, 2017, which claims priority benefit of Japanese Patent Application No. JP 2016-059916 filed in the Japan Patent Office on Mar. 24, 2016. Each of the above-referenced applications is hereby incorporated herein by reference in its entirety.

TECHNICAL FIELD

The present disclosure relates to an imaging unit support apparatus that supports an imaging unit located outside a vehicle from a side of the vehicle, and particularly to the technical field of an imaging unit support apparatus having a function of collision avoidance.

BACKGROUND ART

Vehicles such as an automobile have included a rear-view mirror such as a door mirror and a fender mirror. In recent years, an attempt to remove the rear-view mirror to reduce the air resistance is made from a viewpoint of $CO_2$ (carbon dioxide) reduction, vehicle design, and the like.

For example, instead of the rear-view mirror, a CMS (camera monitoring system) in which a camera (imaging unit) picks up an image of the rear view of the vehicle and a crew such as a driver checks the image is being introduced.

In the CMS, a configuration in which an imaging unit is placed on a tip portion of an arm (supporting portion) that extends to the outside direction from a side of the vehicle is generally employed. Because the imaging unit can be downsized as compared with an existing rear-view mirror, it is possible to reduce the air resistance.

Note that Japanese Patent Application Laid-open No. 1994-64479 discloses the technology that causes a camera head to project or retreat in the vertical direction by using a cylindrical body provided to the front end portion of a vehicle.

CITATION LIST

Patent Literature

[PTL 1]
Japanese Patent Application Laid-open No. 1994-64479

SUMMARY

Technical Problem

However, when a small-sized imaging unit is provided to a vehicle instead of an existing rear-view mirror, the visibility from people around the vehicle, such as a pedestrian and a driver of a two-wheeled vehicle, tends to be reduced, and thus, the risk of collision when passing by the vehicle is increased.

In view of the above, it is desirable to solve such a problem, and ensure the safety against collision in an imaging unit support apparatus that supports, from a side of a vehicle, an imaging unit located outside the vehicle.

Solution to Problem

Various embodiments are described herein that at least partially provide solutions, and at least some of the embodiments are described as follows:
(1) A dynamically deployable side-view camera mount, including:
   a support body having a proximal end that attaches to a motorized vehicle, and a distal end that connects to a side-view camera, and the support body is mounted such that
   when the support body is in a deployed position, the distal end is positioned away from the motorized vehicle, and an image scene captured by the side-view camera is from a rearward perspective with respect to a forward-moving direction of the motorized vehicle, the image scene spanning an angular range, and
   when the support body is in a retracted position, the distal end of the support body is positioned closer to the motorized vehicle than when the support body is in the deployed position, and the side-view camera is positioned to at least partially include the angular range captured by the side-view camera when the support body is in the deployed position.
(2) The dynamically deployable side-view camera mount according to (1), further including:
   a retraction device comprising a biasing member that, in response to a contact force on the support body and/or side-view camera, applies a retraction force that urges the support body toward the motorized vehicle to the retracted position.
(3) The dynamically deployable side-view camera mount according to (1), wherein:
   the support body includes two support arms arranged in parallel and interconnected at respective ends thereof with support links attached at pivot points so the two support arms remain substantially in parallel when in the deployed position and when in the retracted position.
(4) The dynamically deployable side-view camera mount according to (3), wherein:
   an optical axis of the side-view camera when the support body is in the deployed position not being parallel to the optical axis of the side-view camera when the support body is in the retracted position.
(5) The dynamically deployable side-view camera mount according to (4), wherein:
   at least a part of the support body is configured to rest within a recessed portion of a body of the motorized vehicle when the support body is in the retracted position.
(6) The dynamically deployable side-view camera mount according to (1), wherein:
   the support body includes a plurality of meshed gear plates that rotate relative to one another when the support body is moved between the deployed position and the retracted position.
(7) The dynamically deployable side-view camera mount according to (2) wherein:
   the support body includes an extendable arm attached to the biasing member that is connected at one end to the support body and to the motorized vehicle at the other end so as to exert a retraction force on the support body when the support body is in the retracted position or the deployed position.
(8) The dynamically deployable side-view camera mount according to (1), further including:

a first motor configured to respond to a user-initiated control signal to deploy the support body and/or retract the support body.

(9) The dynamically deployable side-view camera mount according to (1), further including:
a lock that keeps the support body in the deployed position if a torque generated by the contact force is less than a predetermined torque, but permits the support body to move to the retracted position if the torque is greater than the predetermined torque.

(10) The dynamically deployable side-view camera mount according to (1), further including:
a second motor configured to move the side-view camera to a first user-selectable preset position when the support body is in the deployed position, and move the side-view camera to a second user-selectable preset position when the support body is in the retracted position.

(11) The dynamically deployable side-view camera mount according to (1), further including:
a cover disposed on the support body on an opposite side of the side-view camera so as to avoid blocking the image scene captured by the side-view camera.

(12) The dynamically deployable side-view camera mount according to (11), wherein the cover includes a fin that reduces wind loading on the support body and side-view camera when the motorized vehicle is moving in the forward-moving direction.

(13) The dynamically deployable side-view camera mount according to (11), wherein the cover comprises an elastic material.

(14) A dynamically deployable side-view camera system, including:
a side-view camera; and
a side-view camera mount comprising
a support body having a proximal end that attaches to a motorized vehicle, and a distal end that connects to a side-view camera mounted such that
when the support body is in a deployed position, the distal end is positioned away from the motorized vehicle, and an image scene captured by the side-view camera is from a rearward perspective with respect to a forward-moving direction of the motorized vehicle, the image scene spanning an angular range, and
when the support body is in a retracted position, the distal end of the support body is positioned closer to the motorized vehicle than when the support body is in the deployed position, and the side-view camera is positioned to at least partially include the angular range captured by the side-view camera when the support body is in the deployed position.

(15) The dynamically deployable side-view camera system according to (14), further including:
a retraction device comprising a biasing member that, in response to a contact force on the support body and/or side-view camera, applies a retraction force that urges the support body toward the motorized vehicle to the retracted position.

(16) The dynamically deployable side-view camera system according to (14), further including:
a light source disposed on the support body or the side-view camera.

(17) The dynamically deployable side-view camera system according to (16), wherein
the light source is configured to have a different emission state when the support is in the deployed state than when in the retracted state.

(18) The dynamically deployable side-view camera system according to (15), further including:
a motor configured to controllably retract the support body to the retracted position.

(19) The dynamically deployable side-view camera system according to (18), further including:
a sensor that is supported by the distal end of the support body and oriented to the forward-moving direction, and
a processor configured to identify an object approaching the sensor and actuates the motor to retract the support body to avoid the object striking the support body and/or side-view camera.

(20) The dynamically deployable side-view camera system according to (19) wherein:
the sensor is a forward-view camera configured to capture a forward-looking scene; and
the processor configured to identify an object in the forward-looking scene approaching the forward-view camera.

(21) A vehicle including:
a dynamically deployable side-view camera system, including
a side-view camera,
a support body having a proximal end that attaches to a motorized vehicle, and a distal end that connects to a side-view camera mounted such that
when the support body is in a deployed position, the distal end is positioned away from the motorized vehicle, and an image scene captured by the side-view camera is from a rearward perspective with respect to a forward-moving direction of the motorized vehicle, the image scene spanning an angular range, and
when the support body is in a retracted position, the distal end of the support body is positioned closer to the motorized vehicle than when the support body is in the deployed position, and the side-view camera is positioned to at least partially include the angular range captured by the side-view camera when the support body is in the deployed position; and
a display mounted to a control panel of the motorized vehicle and configured to display the image scene captured by the side-view camera.

(22) The vehicle according to (21), further including:
another side-view camera, and
another support body attached at a proximal end thereof to the other side of the motorized vehicle, and connected to the another side-view camera at a distal end thereof;
wherein the display being configured to display another image scene captured by the another side-view camera from a different rearward perspective than the image scene captured by the side-view camera.

Advantageous Effects

According to the present technology, it is possible to ensure the safety against collision in an imaging unit support apparatus that supports an imaging unit located outside a vehicle from the vehicle side.

Note that the effect described here is not necessarily limitative and may be any effect described in the present disclosure.

BRIEF DESCRIPTION OF DRAWINGS

FIG. 3A is a cross-sectional view showing a cross-section taken along the line A-A' shown in FIG. 2.

FIG. 3B is an enlarged view of the area surrounded by dotted lines in FIG. 3A.

FIG. 4 is a cross-sectional view showing the unlocking mechanism of an unlocking member.

DESCRIPTION OF EMBODIMENTS

Hereinafter, embodiments of the present technology will be described with reference to the drawings. Note that descriptions will be made in the following order.

<1. First Embodiment>
[1-1. Configuration Example 1]
[1-2. Configuration Example 2]
[1-3. Modified Example of Change Suppression mechanism]
[1-4. Another Modified Example]
<2. Second Embodiment>
<3. Third Embodiment>
<4. Summary of Embodiments>
<5. Present Disclosure>

1. First Embodiment 1-1. Configuration Example 1

First, an imaging unit support apparatus 1 (such as, for example, a dynamically deployable side-view camera mount) according to a configuration example 1 in a first embodiment will be described with reference to FIGS. 1, 2, 3A, 3B, 4, 5, and 6.

Figure 1:
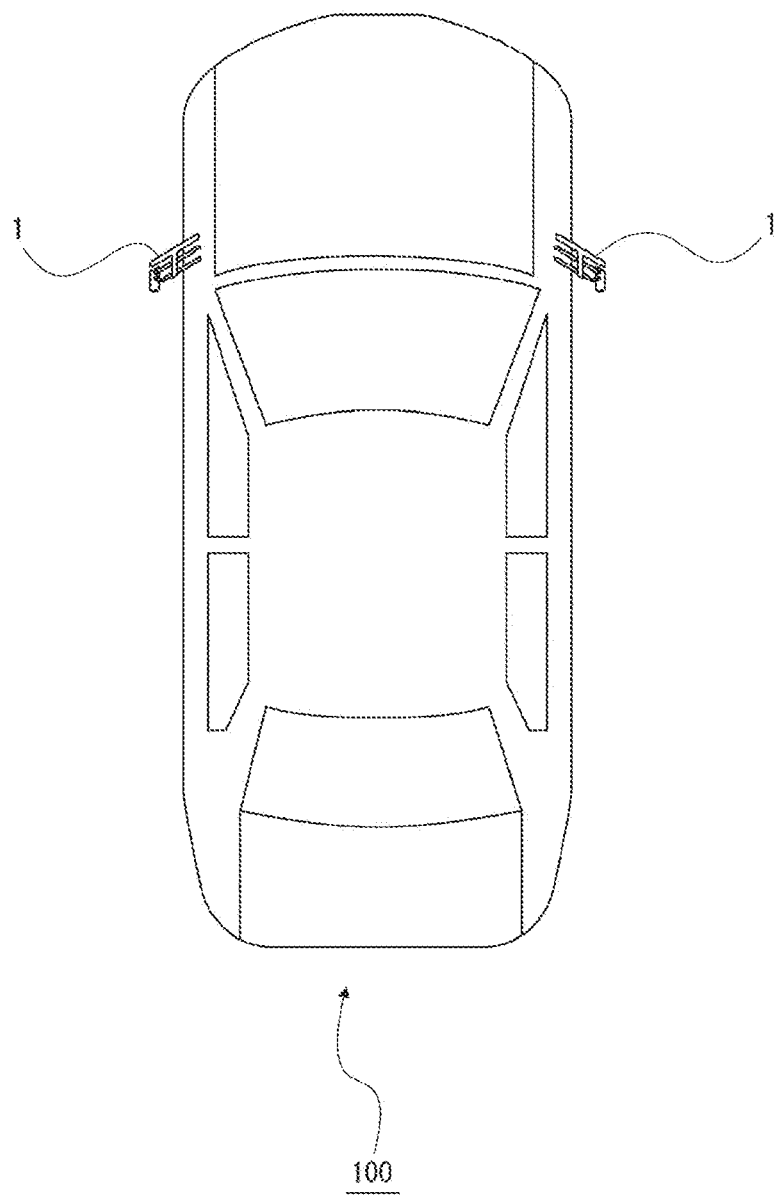
FIG. 1 is a top view of a vehicle to which an imaging unit support apparatus is provided.

FIG. 1 is a top view of a vehicle 100 (such as a motorized vehicle) to which the imaging unit support apparatus 1 is provided.

The imaging unit support apparatus 1 in this example is used as a part of a CMS (camera monitoring system) serving as a rear-view mirror of the vehicle 100, and supports an imaging unit (imaging unit 2 to be described later) from a side of the vehicle 100. The imaging unit is placed at a position outside the vehicle 100 in a direction for picking up an image of the rear side.

In this example, the imaging unit support apparatus 1 is provided to the vehicle 100 on the right and left sides. Specifically, one imaging unit support apparatus 1 is placed in the vicinity of the upper portion of the right front wheel on the right side of the vehicle 100, and the other imaging unit support apparatus 1 is placed in the vicinity of the upper portion of the left front wheel on the left side of the vehicle 100.

Figure 2:
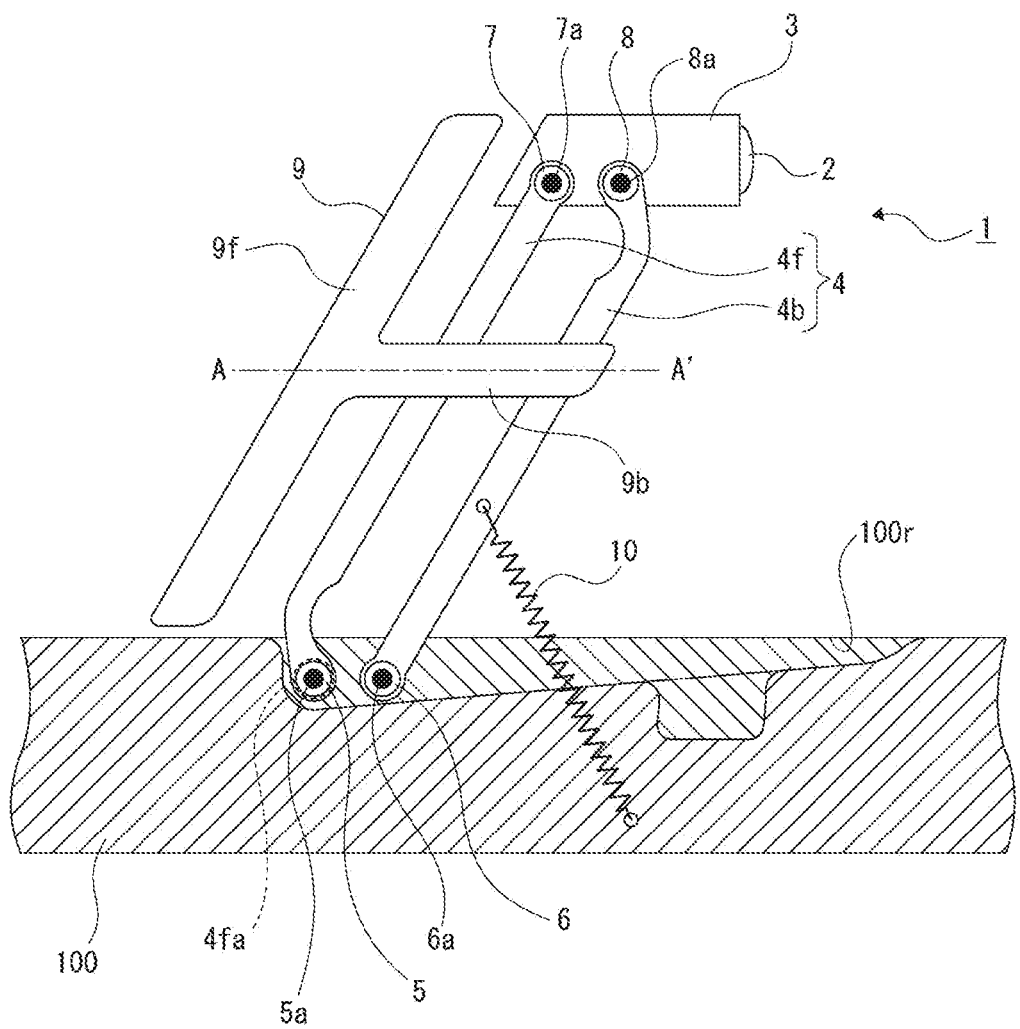
FIG. 2 is a top view showing the mechanical schematic configuration of the imaging unit support apparatus according to a configuration example 1 in a first embodiment.

FIG. 2 is a schematic configuration diagram showing the mechanical schematic configuration of the imaging unit support apparatus 1. Note that although the configuration of the imaging unit support apparatus 1 provided on the right side of the vehicle 100 will be typically described in the following, description of the configuration of the imaging unit support apparatus 1 provided on the left side of the vehicle 100 is omitted because it is similar thereto (mirror-reversed configuration).

In FIG. 2, the imaging unit support apparatus 1 is represented by a top view. The left side of the sheet of FIG. 2 corresponds to the front side of the vehicle 100, and the right side of the sheet of FIG. 2 corresponds to the rear side of the vehicle 100. Further, in FIG. 2, the area inside the vehicle 100 is represented as a shaded area, and a right side surface 100r of the vehicle 100 is shown.

Note that the position of a supported portion 3 (imaging unit 2) shown in FIG. 2 is apart from the vehicle 100 to some extent as a position in a normal use. In the following, the position of the supported portion 3 apart from the vehicle 100 to some extent is referred to as the "deployed position" or "normal position."

As shown in FIG. 2, the imaging unit support apparatus 1 includes the supported portion 3 to which the imaging unit 2 is provided, a supporting portion 4 (such as a support body) that includes a front side supporting member 4f (such as a support arm) having, for example, a plate-like shape and a rear side supporting member 4b (such as a support arm) having, for example, a plate-like shape, and supports the supported portion 3, a vehicle side connection portion 5 that connects one end portion (such as a proximal end) of the front side supporting member 4f to the vehicle 100, a vehicle side connection unit 6 that connects one end portion of the rear side supporting member 4b to the vehicle 100, a supported portion side connection portion 7 that connects the other end portion (such as a distal end) of the front side supporting member 4f to the supported portion 3, and a supported portion side connection portion 8 that connects the other end portion of the rear side supporting member 4b to the supported portion 3.

In addition, the imaging unit support apparatus 1 includes a cover portion 9 and a retraction device (such as a biasing member 10). A part of the cover portion 9 is located at a position on the front side of the supporting portion 4 and the supported portion 3. The biasing member 10 biases the rear side supporting member 4b.

The imaging unit 2 (such as a side-view camera) at least includes, for example, an imaging lens and an image sensor. The image sensor detects light entered from an object via the imaging lens, and acquires a picked-up image of the object.

The supported portion 3 functions as a cover of the imaging unit 2, and holds the imaging unit 2 therein in this example.

When the supported portion 3 is located at the normal position, the imaging lens of the imaging unit 2 faces the rear side. Specifically, the imaging direction of the imaging unit 2 is the rear side.

Note that although description by illustration is omitted, data representing an image scene picked up by the imaging unit 2 (picked-up image data) is supplied to a display apparatus provided at a predetermined position in the interior of the vehicle 100 (e.g., in a meter panel) via an electrical wiring (not shown). Accordingly, a crew such as a driver is able to visually confirm, via the display apparatus, the rear view image picked up by the imaging unit 2. In other words, the driver is able to visually confirm an image scene which is from a rearward perspective with respect to a forward-moving direction of the motorized vehicle. It will also be appreciated that the image scene spans an angular range.

In this example, the vehicle side connection portions 5 and 6 and the supported portion side connection portions 7 and 8 are each connected to a corresponding supporting member as described below.

First, the front side supporting member 4f and the rear side supporting member 4b each have a through-hole formed at one end portion (end portion on the side of the vehicle 100) and the other end portion (end portion on the side of the supported portion 3). The through-hole penetrates the corresponding supporting member in the longitudinal direction (vertical direction of the vehicle 100).

The vehicle side connection portion 5 includes an axial member 5a having a substantially columnar shape. The lower end of the axial member 5a is fixed to the vehicle 100. The axial member 5a is inserted into the through-hole formed on the one end of the front side supporting member 4f. Accordingly, the vehicle side connection portion 5 connects the front side supporting member 4f to the vehicle 100 so that the front side supporting member 4f is rotatable with the axial member 5a as a pivot shaft at a pivot point.

Similarly, the vehicle side connection unit 6 includes an axial member 6a having a substantially columnar shape. The lower end of the axial member 6a is fixed to the vehicle 100. The axial member 6a is inserted into the through-hole formed on the one end of the rear side supporting member 4b. Accordingly, the vehicle side connection portion 6 connects the rear side supporting member 4b to the vehicle 100 so that the rear side supporting member 4b is rotatable with the axial member 6a as a pivot shaft at a pivot point.

Further, the supported portion side connection portions 7 and 8 respectively include axial members 7a and 8a having a substantially columnar shape. The lower ends of the axial members 7a and 8a are fixed to the supported portion 3. The axial member 7a of the supported portion side connection portion 7 is inserted into the through-hole formed on the other end of the front side supporting member 4f, and the axial member 8a of the supported portion side connection portion 8 is inserted into the through-hole formed on the other end of the rear side supporting member 4b. Accordingly, the supported portion side connection portion 7 connects the front side supporting member 4f and the supported portion 3 to each other so that the supported portion 3 is rotatable with the axial member 7a as a pivot shaft at a pivot point. On the other hand, the supported portion side connection portion 8 connects the rear side supporting member 4b and the supported portion 3 to each other so that the supported portion 3 is rotatable with the axial member 8a as a pivot shaft at a pivot point.

Note that placement positions of the axial members 5a, 6a, 7a, and 8a are set so that a line connecting central points of the axial members 5a and 6a is substantially in parallel with a line connecting central points of the axial members 7a and 8a in a top view.

It should be noted that the configuration in which the front side supporting member 4f, the rear side supporting member 4b, or the supported portion 3 is rotatably connected is not limited to the above-mentioned example, and it is possible to employ another configuration in which axial members are formed on the front side supporting member 4f and the rear side supporting member 4b and the respective axial members are inserted into insertion holes formed on the vehicle 100 and the supported portion 3, for example.

Further, although a driven unit 4fa shown in FIG. 2 is formed on the front side supporting member 4f in this example, this will be described later.

The cover portion 9 includes a cover front portion 9f having a substantially plate-like shape and a cover rear portion 9b having a substantially plate-like shape, and has a substantially T-shaped outer shape in a top view. The cover front portion 9f covers the front of the supported portion 3 and the supporting portion 4 and extends in the lateral direction. The cover rear portion 9b extends to the rear side from the substantially laterally central portion of the cover front portion 9f.

In this example, at least the front end portion of the cover front portion 9f of the cover portion 9 includes, for example, an elastic material such as a sponge, and thus, has a function of relaxing the impact of collision of an object such as a pedestrian from the front side.

Note that the detailed configuration of the cover portion 9 will be described later.

The biasing member 10 includes an elastic body having an elongation force such as a tension coil spring. One end of the biasing member 10 is fixed to the vehicle 100, and the other end of the biasing member 10 is fixed to the rear side supporting member 4b. The biasing member 10 biases the rear side supporting member 4b in the direction approaching to the vehicle 100.

Note that because an unlocking member 11 provided to the cover portion 9, which will be described later, locks the movement (pivot) of the rear side supporting member 4b (and the front side supporting member 4o when the supported portion 3 is located at the normal position, the rear side supporting member 4b is not driven by the biasing force of the biasing member 10.

FIG. 3A is a cross-sectional view showing a cross-section of the cover portion 9, the front side supporting member 4f, and the rear side supporting member 4b taken along the line A-A' shown in FIG. 2. Note that also in FIG. 3A, the left side of the sheet of the figure corresponds to the front side of the vehicle 100. FIG. 3B is an enlarged view of the area surrounded by dotted lines in FIG. 3A.

As shown in FIG. 3A, a space S is formed in the cover rear portion 9b of the cover portion 9, and the front side supporting member 4f and the rear side supporting member 4b are inserted into the space S.

In this example, an upper surface 9u of the cover front portion 9f is formed so that the height thereof is gradually increased from the front end to the rear side. A lower surface 9d of the cover front portion 9f is formed so that the height thereof is gradually decreased from the front end to the rear side. Accordingly, the front end portion of the cover front portion 9f functions as a rectification fin that rectifies the airflow generated during the forward travelling of the vehicle 100.

Note that various configurations for rectifying the airflow are considerable, and the configuration for rectifying the airflow is not limited to the above-mentioned example.

In the cover rear portion 9b, the upper surface and the lower surface of the rear side supporting member 4b are respectively not brought into contact with an upper inner surface 9bu and lower inner surface 9bd of the cover rear portion 9b. Accordingly, spaces are formed between the upper surface of the rear side supporting member 4b and the upper inner surface 9bu and between the lower surface of the rear side supporting member 4b and the lower inner surface 9bd (see FIG. 3B).

To the cover portion 9, the unlocking member 11 having, for example, a bar shape is provided. The front end portion of the unlocking member 11 is located at the front end portion of the cover front portion 9f, and the rear end portion of the unlocking member 11 is located in the space S of the cover rear portion 9b. Further, in the cover rear portion 9b, a locking portion 9m is formed (see FIG. 3B). The locking portion 9m has a locking surface 9ms that faces the front surface of the rear side supporting member 4b. In this example, the locking portion 9m is formed to have a downward convex shape. When the supported portion 3 is located at the normal position, the locking surface 9ms is brought into contact with the front end surface of the rear side supporting member 4b.

Note that the formation position of the locking portion 9m in the lateral direction is a position avoiding (that does not overlap) the placement position of the rear end portion of the unlocking member 11

On the rear end portion of the unlocking member 11, a rear-upward slope 11a is formed. The slope 11a is the rear end surface of the unlocking member 11.

When the supported portion 3 is located at the normal position, the rear end (the uppermost end of the slope 11a) of the slope 11a of the unlocking member 11 is located on the upper side of the rear side supporting member 4b and behind the front end surface of the rear side supporting member 4b. When the supported portion 3 is located at the normal position, the front end uppermost portion of the rear side supporting member 4b is brought into contact with the slope 11a.

Note that at least a part of the front side supporting member 4f is fixed to the cover portion 9 although this is not reflected on the figure. Specifically, the cover portion 9 can be displaced in synchronization with the front side supporting member 4f.

Because the front side supporting member 4f is fixed to the cover portion 9 as described above, the locking portion 9m having the locking surface 9ms that is brought into contact with the front end surface of the rear side supporting member 4b as described above functions as a locking mechanism that locks the movement of the front side supporting member 4f and the rear side supporting member 4b against the biasing of the biasing member 10. As will be described later, in order to pivot the front side supporting member 4f and the rear side supporting member 4b in a direction approaching to the vehicle 100 by the biasing force of the biasing member 10, the distance between the front side supporting member 4f and the rear side supporting member 4b needs to be gradually decreased in the process of the pivot. When the front side supporting member 4f is fixed to the cover portion 9 as described above, the distance between the front side supporting member 4f and the rear side supporting member 4b is not decreased because of the existence of the locking portion 9m, even when a force or a torque acts on the front side supporting member 4f to be pivoted in the retreat direction on the basis of the biasing force of the biasing member 10. In other words, the movement the front side supporting member 4f and the rear side supporting member 4b in the direction approaching to the vehicle 100 is locked.

In the imaging unit support apparatus 1 having the above-mentioned configuration, an operation when an object such as a pedestrian approaches from the front and collides with the cover front portion 9f will be described.

First, at an initial stage of the collision, the cover front portion 9f formed of an elastic material such as a sponge as described above is elastically deformed, thereby relaxing the impact of collision.

Then, in response to the collision, a force or a torque that retreats the unlocking member 11 acts. When the unlocking member 11 retreats by the collision, the front end uppermost portion of the rear side supporting member 4b slides on the slope 11a as the slope 11a of the rear end portion of the unlocking member 11 retreats. Specifically, the front end uppermost portion of the rear side supporting member 4b slides on the slope 11a toward the lower end of the slope 11a. Accordingly, as shown in FIG. 4, at least the front end portion of the rear side supporting member 4b is depressed lower than the lowermost point of the locking portion 9m by the unlocking member 11. As a result, the rear side supporting member 4b is capable of moving toward the front through below the locking portion 9m. Specifically, the locking by the locking portion 9m is released.

The locking by the locking portion 9m is released, thereby enabling the distance between the front side supporting member 4f and the rear side supporting member 4b to be decreased. Therefore, by the biasing force of the biasing member 10, the front side supporting member 4f and the rear side supporting member 4b are pivoted in the direction approaching to the vehicle 100. In other words, the locking mechanism keeps the support body in the deployed position if a torque generated by the contact force is less than a predetermined torque, but permits the support body to move to the retracted position if the torque is greater than the predetermined torque. Hereinafter, the pivot direction toward the direction approaching to the vehicle 100 is referred to also as the "retreat direction."

At this time, because a line connecting central points of the axial members 5a and 6a is substantially in parallel with a line connecting central points of the axial members 7a and 8a in a top view as described above, the orientation of the supported portion 3 is not substantially changed from the orientation at the normal position in the process where the front side supporting member 4f and the rear side supporting member 4b are pivoted in the retreat direction, i.e., the supported portion 3 is pivoted in the retreat direction. Specifically, the direction of imaging performed by the imaging unit 2 is kept to be the rear direction.

The reason why the change in the imaging direction is suppressed as described above is that the supported portion 3 is pivoted in the pivot direction opposite to the retreat direction with, respectively, the axial members 7a and 8a as axes along with the pivot of the front side supporting member 4f and the rear side supporting member 4b in the retreat direction.

In this example, the change suppression mechanism that suppresses the change in the direction of imaging performed by the imaging unit 2 includes the axial members 5a, 6a, 7a, and 8a, and insertion holes into which these axial members are inserted, which are formed on the front side supporting member 4f and the rear side supporting member 4b.

Figure 5:
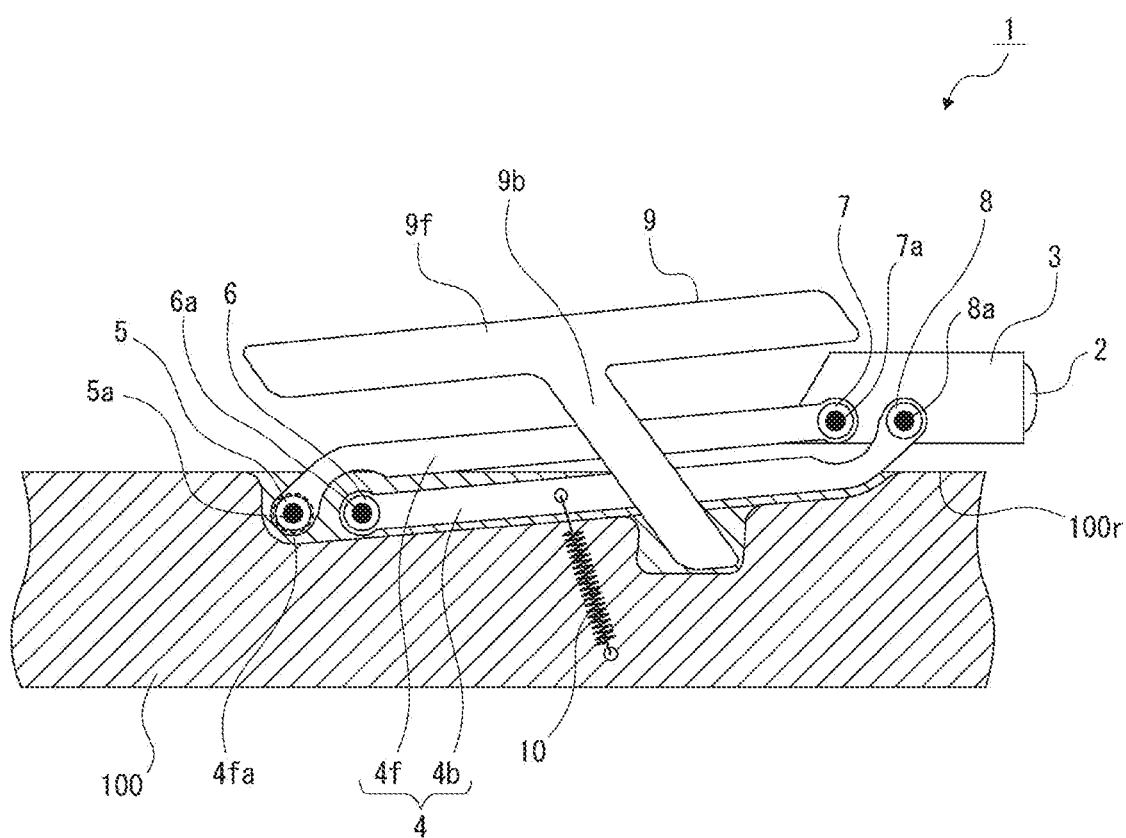
FIG. 5 is a top view illustrating the retreated supported portion.

FIG. 5 is a top view illustrating the retreated supported portion 3.

Hereinafter, the position of the retreated supported portion 3 as shown in FIG. 5 is referred to as the "deployed position" or "retreat position."

When FIG. 5 is compared with FIG. 2, it can be found that the direction of imaging performed by the imaging unit 2 is not substantially changed between the normal position and the retreat position.

Further, when the distance between the front side supporting member 4f and the rear side supporting member 4b in FIG. 5 is compared with that in FIG. 2, it can be found that the distance in FIG. 5 is shorter than that in FIG. 2. As can be seen from this, the distance between the front side supporting member 4f and the rear side supporting member 4b needs to be gradually decreased in the process of pivot toward the retreat direction.

Note that in the above-mentioned imaging unit support apparatus 1, the front side supporting member 4f and the rear side supporting member 4b are driven in the retreat direction by the biasing force of the biasing member 10 in response to the unlocking of the unlocking member 11. With this configuration, in response to the unlocking, it is possible to drive the supporting portion 4 (the front side supporting member 4f and the rear side supporting member 4b) in the retreat direction by a drive force larger than the input drive force along with the collision. Specifically, it is possible to cause the supported portion 3 (the imaging unit 2) to retreat with a larger acceleration when the unlocking is performed in response to the collision.

Therefore, it is possible to reduce the impact given to a collided object such as a person, and improve the safety.

Further, by forming the unlocking member 11 to be lightweight and high-rigidity in the imaging unit support apparatus 1, it is possible to ensure a sufficient depression force for the rear side supporting member 4b at the time of unlocking while keeping the moment at the time of collision small.

Note that a regulation portion that regulates the amount of movement of the supported portion 3 from the normal position in the direction approaching to the vehicle 100 may be provided to the imaging unit support apparatus 1. The regulation portion can be achieved by, for example, providing, to the vehicle 100, a stopper member (e.g., rubber) that receives the supported portion 3 or the rear side supporting member 4b moving toward the vehicle 100.

With the above-mentioned regulation portion, it is possible to set the retreat position of the supported portion 3 to a predetermined position. Further, by forming the above-mentioned regulation portion with an elastic body that is an impact cushioning material at the time of retreat, it is possible to obtain effects of relaxing impact on the supported portion 3 (the imaging unit 2), and prevent the apparatus from being damaged.

The imaging unit support apparatus 1 in this example has a configuration for returning the supported portion 3 that has retreated to the retreat position to the normal position as well as the above-mentioned mechanism for causing the supported portion 3 to retreat in response to collision.

Specifically, the driven unit 4fa shown in FIG. 2 is formed on an end portion (end portion on the side of the vehicle 100) of the front side supporting member 4f in the imaging unit support apparatus 1. The driven unit 4fa is a part that projects downward from one end lower surface of the front side supporting member 4f and has a substantially cylindrical shape, and the central axis of the driven unit 4fa corresponds to the pivot shaft of the front side supporting member 4f by the vehicle side connection portion 5.

Figure 6:
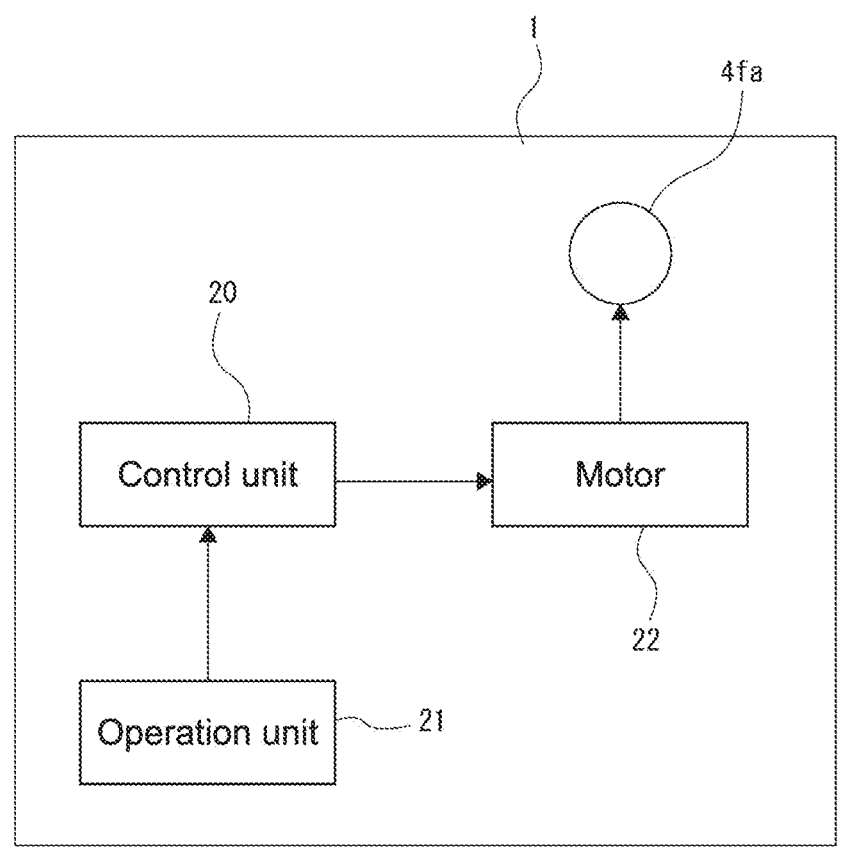
FIG. 6 is a block diagram describing the electrical circuit configuration of the imaging unit support apparatus according to the configuration example 1 in the first embodiment.

Further, the imaging unit support apparatus 1 includes a control unit 20, an operation unit 21, and a motor 22 shown in the block diagram of FIG. 6, as the configuration for driving the above-mentioned the driven unit 4fa. Note that in FIG. 6, also the driven unit 4fa is shown in addition to the control unit 20, the operation unit 21, and the motor 22.

In this example, the control unit 20, the operation unit 21, and the motor 22 are located in the vehicle 100.

In FIG. 6, the operation unit 21 includes an operation element such as a button, a knob, and a touch panel, and supplies an operation signal based on the operation of the operation element to the control unit 20. The control unit 20 includes an electronic circuit, and controls the rotation of the motor 22 on the basis of the operation signal supplied from the operation unit 21.

The rotation shaft of the motor 22 is mechanically coupled to the driven unit 4fa, and the motor 22 is capable of driving the driven unit 4fa to be rotated with the above-mentioned rotation shaft that corresponds to the pivot shaft of the front side supporting member 4f by the vehicle side connection portion 5.

The control unit 20 causes the motor 22 to be rotated in a predetermined rotation direction on the basis of the operation signal supplied from the operation unit 21. Specifically, the control unit 20 causes the driven unit 4fa to be rotated in the direction in which the driven unit 4fa is driven to be rotated in the rotation direction opposite to the above-mentioned retreat direction. Accordingly, it is possible to return the supported portion 3 located at the retreat position to the normal position.

Note that the control unit 20 is capable of moving the supported portion 3 from the normal position to the retreat position by causing the motor 22 to be rotated in the rotation direction opposite to the above-mentioned rotation direction (direction for rotating the driven unit 4fa in the retreat direction).

For example, the existing the rear-view mirror is folded to the side of the vehicle in response to the operation performed by a driver, and the folded rear-view mirror is returned to the original position. According to the configuration shown in FIG. 6, it is possible to achieve driving of the supported portion 3 (the imaging unit 2) similar to this.

Note that although the supported portion 3 is driven to the normal position or the retreat position by using the operation input as a trigger in the above-mentioned example, it is possible to drive the supported portion 3 to the normal position or the retreat position by using, as a trigger, establishment of another condition, e.g., the state of the vehicle 100 such as starting/stopping of the engine is a predetermined state, instead of the operation input.

Further, the driving of the supported portion 3 is not limited to the alternative of the normal position or the retreat position, and it is possible to drive the supported portion 3 to an arbitrary position between the normal position and the retreat position. Further, it is also possible to change the direction of imaging performed by the imaging unit 2 by providing a variable supporting mechanism that is capable of changing the orientation of the supported portion 3 and driving the variable supporting mechanism. At this time, it may be possible to perform control of driving the supported portion 3 to an arbitrary position between the normal position and the retreat position and changing the imaging direction in synchronization with each other. The stopping position of the supported portion 3 between the normal position and the retreat position and the orientation of the imaging direction can be set on the basis of information on the speed of the vehicle 100, information on the transmission gear ratio, information on the steering angle, GPS location information, itinerary/steering-path planning information, and the like. Furthermore, the motor 22 or another motor is controllably actuated to position the imaging unit 2 (video camera) to set the imaging unit to a first user-selectable preset position when the supporting portion 4 (support body) is in the deployed position (e.g., FIG. 2), and to set the imaging unit to another user-selectable present position when the support body is in the retracted position (e.g., FIG. 5). In this way, the user may orient the imaging unit 2 to his or her preference and capture the image scene from the side/rear facing direction to best suit the user's personal preference. Accordingly, a shorter driver may select different preset positions than a taller driver. It should also be noted that the motor 22 may be included that retracts/deploys the support body under control of the control unit 20. This allows for not only user-controlled movement of the support body 4, but also automated control. For example, the imaging unit 2 may include a second camera that faces in an opposite direction (i.e., forward looking). When the motorized vehicle is moving, a processor in the operation unit 21 may trigger the control unit 20 and motor 22 to retract the support body 4 when an object approaching the support body 4 or imaging unit 2 before the object strikes the support body 4 or imaging unit 2. Likewise, when the motorized vehicle has stopped moving and turned off, the operation unit 21 may trigger the control unit 20 and motor 22 to retract the support body 4 so as to reduce the footprint of the vehicle when parked and avoid having the support body 4 being an inadvertent hazard to pedestrians who walk by the vehicle or other vehicles that park nearby. The imaging unit 2 is not limited to include the second camera. Suitable sensors, such as a radar sensor, a sonar sensor, a ToF (Time of Flight) sensor or combination thereof, can be applied to the imaging unit 2 to sense an approaching object.

Further, as a power source for driving the supported portion 3, it is also possible to use another actuator such as a solenoid instead of the motor 22.

Further, it is also possible to impart the drive force for driving the supported portion 3 on the rear side supporting member 4b instead of the front side supporting member 4f, or on the front side supporting member 4f and the rear side supporting member 4b.

1-2. Configuration Example 2

Next, an imaging unit support apparatus 1A according to a configuration example 2 in the first embodiment will be described with reference to FIGS. 7A, 7B, 8, 9A and 9B.

The configuration of the supporting portion 4 for locking and unlocking in the configuration example 2 is different from that in the configuration example 1.

Note that in the following description, the same components as those described above will be denoted by the same reference symbols and a description thereof will be omitted.

Figure 7A:
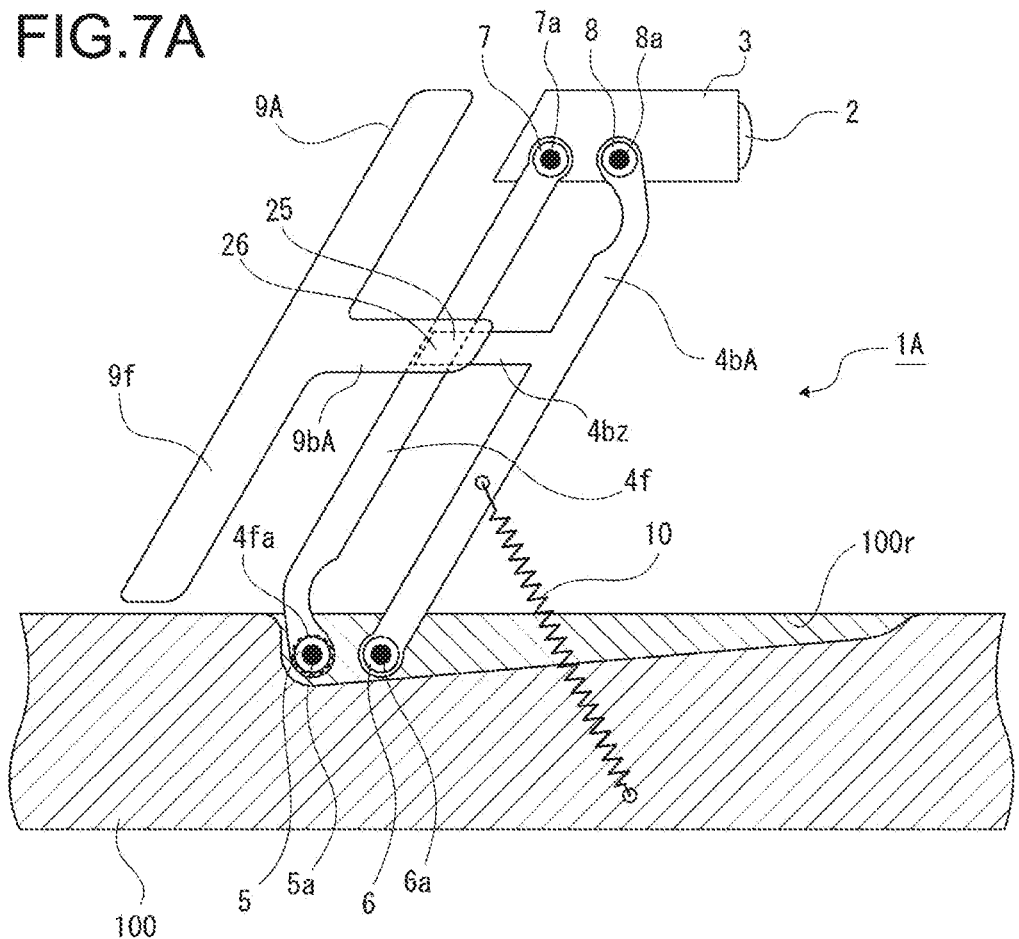
FIG. 7A is a diagram showing the mechanical schematic configuration of an imaging unit support apparatus according to a configuration example 2 in the second embodiment.
Figure 7B:
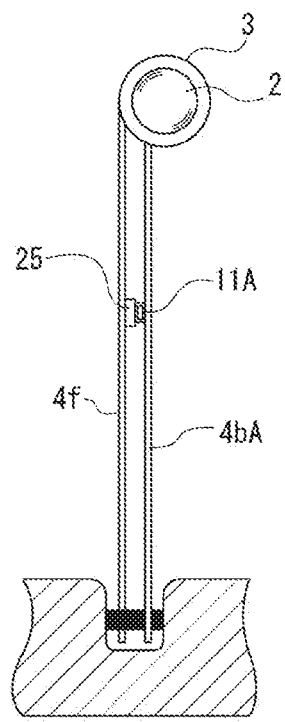
FIG. 7B is a diagram showing the mechanical schematic configuration of the imaging unit support apparatus according to the configuration example 2 in the second embodiment.

FIGS. 7A and 7B are each a diagram showing the mechanical schematic configuration of the imaging unit support apparatus 1A according to the configuration example 2. FIG. 7A shows the configuration of the imaging unit support apparatus 1A in a top view similarly to FIG. 2, and FIG. 7B shows the configuration of the imaging unit support apparatus 1A in a rear view (the left side of the sheet corresponds to the upper side, and the right side of the sheet corresponds to the lower side). Further, FIG. 8 is a perspective view showing the configuration of the main portion for locking and unlocking of the imaging unit support apparatus 1A.

Figure 8:
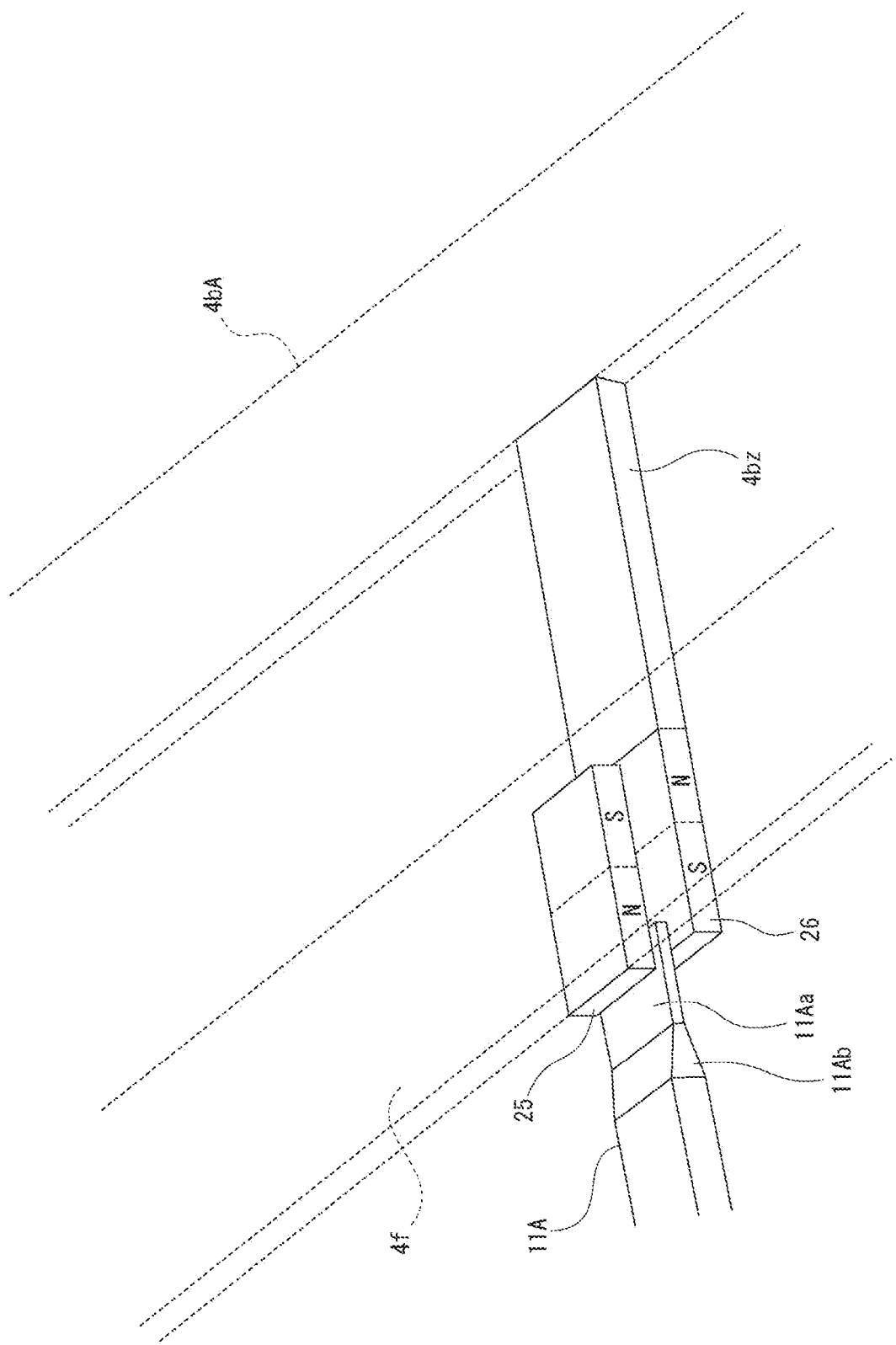
FIG. 8 is a perspective view showing the configuration of a main portion for locking and unlocking of the imaging unit support apparatus shown in FIGS. 7A and 7B.

Note that FIGS. 7 and 8 show the state where the supported portion 3 is located at the normal position. Further, in FIG. 7B, illustration of a cover portion 9A and the biasing member 10 is omitted.

The imaging unit support apparatus 1A includes the cover portion 9A (see FIG. 7A) instead of the cover portion 9. The cover portion 9A is different from the cover portion 9 in that a cover rear portion 9bA is formed instead of the cover rear portion 9b.

Further, the imaging unit support apparatus 1A includes a rear side supporting member 4bA instead of the rear side supporting member 4b. The rear side supporting member 4bA is different from the rear side supporting member 4b in that a projection portion 4bz is formed. The substantially laterally central portion of the rear side supporting member 4bA on the front surface thereof projects toward the front, thereby forming the projection portion 4bz (see FIG. 7A and FIG. 8).

In the imaging unit support apparatus 1A, the position of the front side supporting member 4f is different from the position of the rear side supporting member 4bA in the height direction (FIG. 7A). Specifically, the front side supporting member 4f is formed at a position higher than that of the rear side supporting member 4bA.

In this case, to the substantially laterally central portion of the front side supporting member 4f on the lower surface thereof, a plate-like first magnet 25 is attached (see FIG. 7B and FIG. 8). Further, to the front end surface of the projection portion 4bz of the rear side supporting member 4bA, a plate-like second magnet 26 is attached (see FIG. 8).

The lower surface of the first magnet 25 face the upper surface of the second magnet 26 with a space therebetween, which depends on the difference between the height positions of the front side supporting member 4f and the rear side supporting member 4bA. Further, when the supported portion 3 is located at the normal position, the positional relationship between the first magnet 25 and the second magnet 26 is that the lower surface of the first magnet 25 covers the substantially entire upper surface of the second magnet 26.

In FIG. 8, the relationship between the magnetic poles of the first magnet 25 and the second magnet 26 is illustrated by "S" and "N." However, when the supported portion 3 is located at the normal position, different magnetic poles face each other as shown in FIG. 8.

Further, the imaging unit support apparatus 1A includes an unlocking member 11A (see FIG. 7B and FIG. 8). The unlocking member 11A includes a substantially plate-like member, and the rear end portion of the unlocking member 11A has a wedge shape. Specifically, the unlocking member 11A includes a thin-walled portion 11Aa whose thickness (thickness in the height direction) is the smallest, which is located at the most rear end, and a thickness increased portion 11Ab whose thickness is gradually increased from the front end of the thin-walled portion 11Aa to the front.

The unlocking member 11A is placed so that the thin-walled portion 11Aa occupies a substantially intermediate position between the lower surface of the first magnet 25 and the upper surface of the second magnet 26 in the vertical direction (see FIG. 8).

When the supported portion 3 is located at the normal position, only a part of the thin-walled portion 11Aa on the rear end side is inserted into the gap between the lower surface of the first magnet 25 and the upper surface of the second magnet 26 as shown in FIG. 8.

Note that for example, the front end portion of the unlocking member 11A is located in the front end portion of the cover front portion 9f in the cover portion 9A similarly to the above-mentioned relationship between the unlocking member 11 and the cover front portion 9f although illustration thereof is omitted. Accordingly, the unlocking member 11A retreats by the collision of an object on the cover front portion 9f from the front.

Figure 9A:
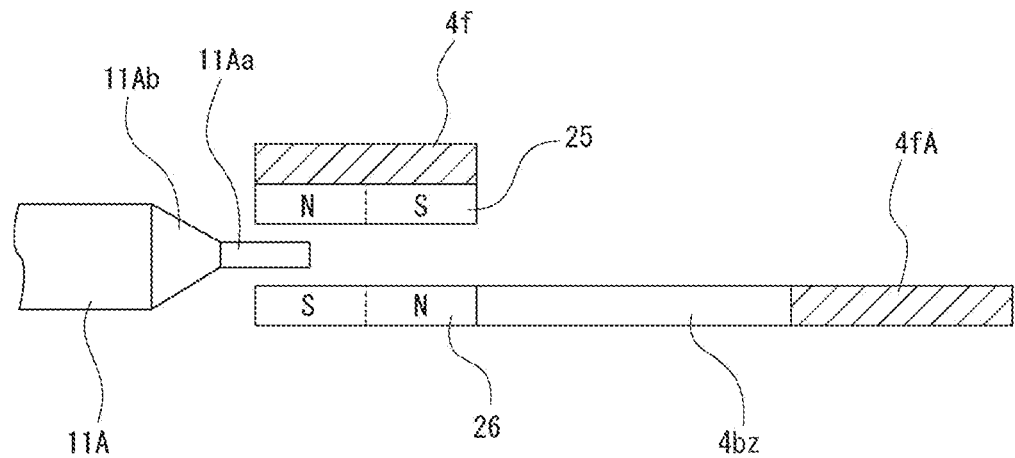
FIG. 9A is a schematic cross-sectional view of the configuration for locking and unlocking in the imaging unit support apparatus shown in FIGS. 7A and 7B.
Figure 9B:
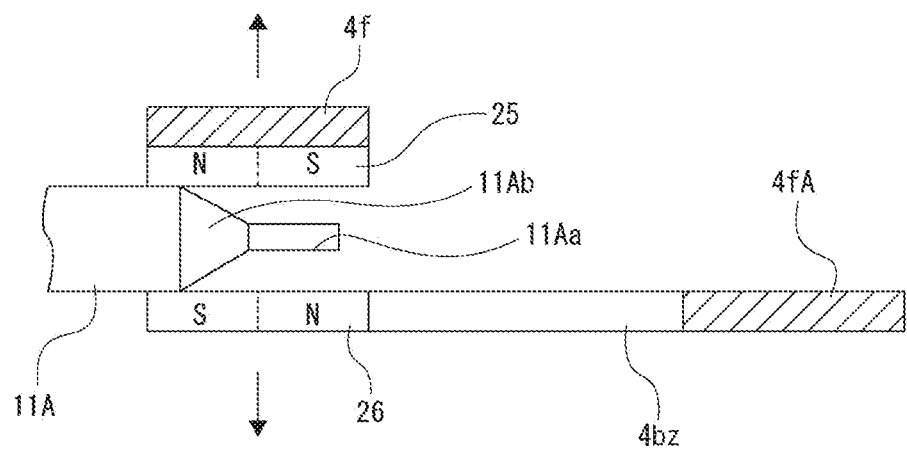
FIG. 9B is a schematic cross-sectional view of the configuration for locking and unlocking in the imaging unit support apparatus shown in FIGS. 7A and 7B.

FIGS. 9A and 9B are each a cross-sectional view of the configuration for locking and unlocking shown in FIG. 8. FIG. 9A shows the state where the supported portion 3 is located at the normal position, and FIG. 9B shows the state at the time of collision.

In the state shown in FIG. 9A, the first magnet 25 and the second magnet 26 are pulled together because different magnetic poles face with each other. Accordingly, the locked state where movement of the front side supporting member 4f and the rear side supporting member 4bA is locked is achieved.

On the other hand, at the time of collision, the unlocking member 11A moves backward behind the position at the locked state. Accordingly, as shown in FIG. 9B, the thickness increased portion 11Ab is pushed between the first magnet 25 and the second magnet 26 and the space between the first magnet 25 and the second magnet 26 is increased.

The increase in the space between the first magnet 25 and the second magnet 26 weakens the attractive force between the first magnet 25 and the second magnet 26, and thus, the locked state is released.

Also in this case, in response to the unlocking, the front side supporting member 4f and the rear side supporting member 4bA start to pivot in the retreat direction by the biasing force of the biasing member 10, and the distance between the front side supporting member 4f and the rear side supporting member 4bA is decreased. By this decrease, the first magnet 25 retreats with respect to the second magnet 26, and thus, the same magnetic poles of the first magnet 25 and the second magnet 26 face each other. Accordingly, the front side supporting member 4f and the rear side supporting member 4bA smoothly pivot at the initial stage of collision.

1-3. Modified Example of Change Suppression Mechanism

A modified example of the change suppression mechanism that suppresses the change in the direction of imaging performed by the imaging unit 2 will be described with reference to FIG. 10 and FIG. 11.

Figure 10:
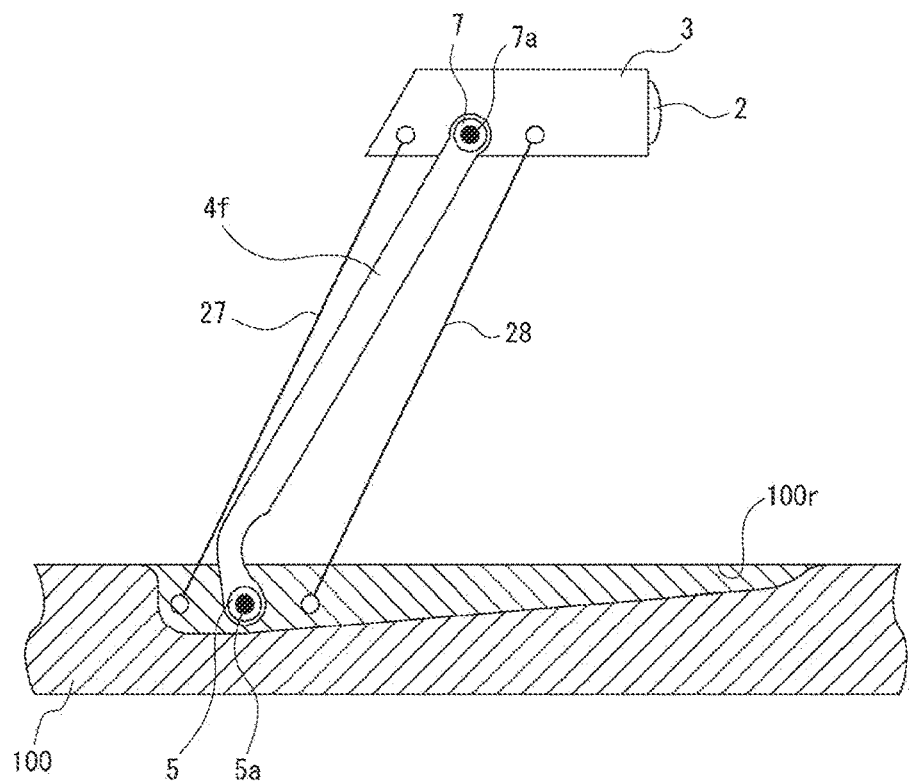
FIG. 10 is an explanatory diagram of a first example of a modified example of a change suppression mechanism.

FIG. 10 is a top view showing the schematic configuration according to a first example of the modified example.

In this case, as the supporting portion for supporting the supported portion 3 from the side of the vehicle 100, only the front side supporting member 4f is used. Also in this case, the front side supporting member 4f is connected to the vehicle 100 and the supported portion 3, respectively, via the vehicle side connection portion 5 and the supported portion side connection portion 7.

To the front of the front side supporting member 4f, a front side member 27 including an elastic body having an elongation force such as a tension coil spring is provided. Behind the front side supporting member 4f, a rear side member 28 including a substantially linear member such as a cord and a chain is provided. One end of the front side member 27 and the rear side member 28 is fixed to the vehicle 100, and the other end of the front side member 27 and the rear side member 28 is fixed to the supported portion 3. The lineal length of the rear side member 28 is substantially the same as the distance (shortest distance) between the central point (pivot shaft of the front side supporting member 4f) of the axial member 5a in the vehicle side connection portion 5 and the central point (pivot shaft of the supported portion 3) of the axial member 7a in the supported portion side connection portion 7.

In this case, a line connecting central points of one end of the rear side member 28 (on the side of the vehicle 100) and the axial member 5a is substantially in parallel with a line connecting central points of the other end of the rear side member 28 (on the side of the supported portion 3) and the axial member 7a in a top view.

With the above-mentioned configuration, the supported portion 3 is pivoted in a pivot direction opposite to the pivot direction of the front side supporting member 4f with the axial member 7a as an axis by the elongation force of the front side member 27 when the front side supporting member 4f is pivoted in the retreat direction in response to the collision of an object from the front. At this time, the lineal length of the rear side member 28 is set as described above and a line connecting central points of one end of the rear side member 28 and the axial member 5a is substantially in parallel with a line connecting central points of the other end of the rear side member 28 and the axial member 7a in a top view, thereby generating substantially no change in the orientation of the supported portion 3 (orientation of the imaging direction) even if the front side supporting member 4f is pivoted in the retreat direction.

Note that the front side member 27 may include a substantially linear member such as a cord and a chain instead of an elastic body. In this case, the lineal length of the front side member 27 is made to be substantially the same as the lineal length of the rear side member 28, and a line connecting central points of one end of the front side member 27 (on the side of the vehicle 100) and the axial member 5a and a line connecting central points of the other end of the front side member 27 (on the side of the supported portion 3) and the axial member 7a in a top view are made to be substantially in parallel with each other to suppress the change in the imaging direction.

In this case, the cord or chain as the front side member 27 may be cut off by a predetermined force to exert the effect of reducing the collision load. At this time, the cord or chain does not necessarily need to be cut off, and the fixation of the cord or chain to the vehicle 100 or the supported portion 3 may be released by a predetermined force.

Figure 11:
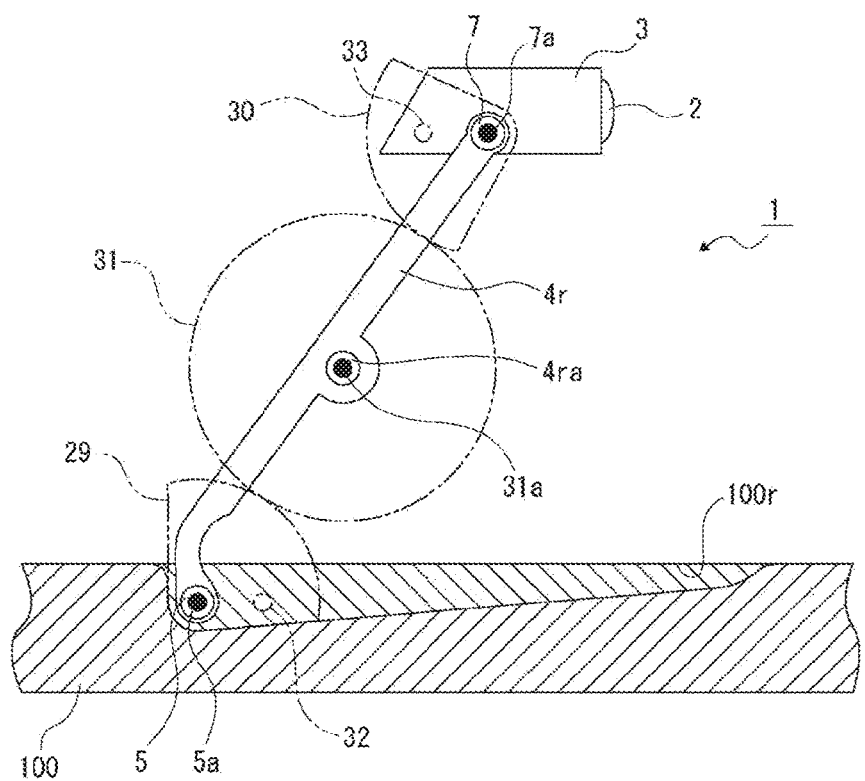
FIG. 11 is an explanatory diagram of a second example of the modified example of the change suppression mechanism.

FIG. 11 is a top view showing the schematic configuration according to a second example.

In the configuration according to the second example, a supporting member 4r is provided as the supporting portion for supporting the supported portion 3 from the side of the vehicle 100. In addition thereto, a fan-shaped member 29, a fan-shaped member 30, and a circular-shaped member 31 (such as a plurality of meshed gear plates) are provided. Note that in FIG. 11, the fan-shaped members 29 and 30 and the circular-shaped member 31 are represented in a transparent state.

The supporting member 4r is different from the front side supporting member 4f in that a connection portion 4ra for rotatably connecting the circular-shaped member 31 is formed at a substantially central portion thereof in the longitudinal direction. In the connection portion 4ra, a through-hole penetrating the supporting member 4r in the vertical direction is formed.

The fan-shaped members 29 and 30 and the circular-shaped member 31 respectively include substantially plate-like members having a substantially fan shape and a substantially circular shape in a top view, and are each located at a position upper than the position of the supporting member 4r.

The fan-shaped member 29 is located at a position where the fan-shaped member 29 covers the vehicle side connection portion 5, and the fan-shaped member 30 is located at a position where the fan-shaped member 30 covers the supported portion side connection portion 7. The fan-shaped members 29 and 30 are located so that the circular arc portions thereof face each other. The fan-shaped members 29 and 30 are respectively fixed by fixation portions 32 and 33 shown in FIG. 11 to the vehicle 100 and the supported portion 3. By the fixation, a positional relationship between the fan-shaped member 29 and the vehicle 100 and a positional relationship between the fan-shaped member 30 and the supported portion 3 are not changed from the respective positional relationship shown in FIG. 11.

The circular-shaped member 31 includes an axial member 31a that is formed on the central portion (central portion in a top view) to have a downward convex shape. The axial member 31a is inserted into the above-mentioned through-hole of the connection portion 4ra, and the circular-shaped member 31 is rotatable around the axial member 31a in the state where the outer circular arc portion thereof faces and is in contact with the circular arc portions of the fan-shaped members 29 and 30.

In the above-mentioned configuration, when a force that causes the supporting member 4r to be pivoted in the retreat direction acts on the supporting member 4r in response to the collision of an object from the front, the circular-shaped member 31 whose outer circular arc portion is in contact with the circular arc portions of the fan-shaped members 29 and 30 is rotated in the clockwise direction in the sheet of FIG. 11 in synchronization with the pivot of the supporting member 4r in the retreat direction. At this time, the circular-shaped member 31 is pivoted in synchronization with the pivot of the supporting member 4r and approaches to the vehicle 100 while being rotated in the clockwise direction.

Then, in synchronization with the above-mentioned rotation of the circular-shaped member 31, the fan-shaped member 30 fixed to the supported portion 3 by a fixation member 33 is rotated in the counterclockwise direction in the sheet of FIG. 11. Specifically, the fan-shaped member 30 is rotated in the rotation direction opposite to the rotation direction of the circular-shaped member 31 (that is, the pivot direction of the supporting member 4r).

Along with the rotation of the fan-shaped member 30 in the reverse rotation direction, the supported portion 3 is gradually pivoted in the same direction as the reverse rotation direction with the axial member 7a as a pivot shaft in synchronization with the pivot of the supporting member 4r in the retreat direction. As a result, the orientation of the supported portion 3 is kept substantially constant even if the supporting member 4r is pivoted in the retreat direction. Accordingly, the change in the direction of imaging performed by the imaging unit 2 due to the retreat is suppressed.

Note that in any case of the above-mentioned first example and the second example, a cover portion on which the cover front portion 9f is formed at the front of the supporting member 4r may be provided, and a drive force that causes the supporting member 4r to be pivoted in the retreat direction by the collision of an object from the front may be applied via the cover front portion 9f.

1-4. Another Modified Example

In the above-mentioned example, the retreat position of the supported portion 3 is a position outside the vehicle 100 (see FIG. 5). However, the retreat position of the supported portion 3 may be a position inside the vehicle 100. Specifically, an operation of causing the supported portion 3 to retreat may be performed until at least a part of the supported portion 3 is located inside the vehicle 100. Accordingly, it is possible to reduce the amount of external projection of the retreated supported portion 3 from the vehicle 100, and improve the safety.

Figure 12:
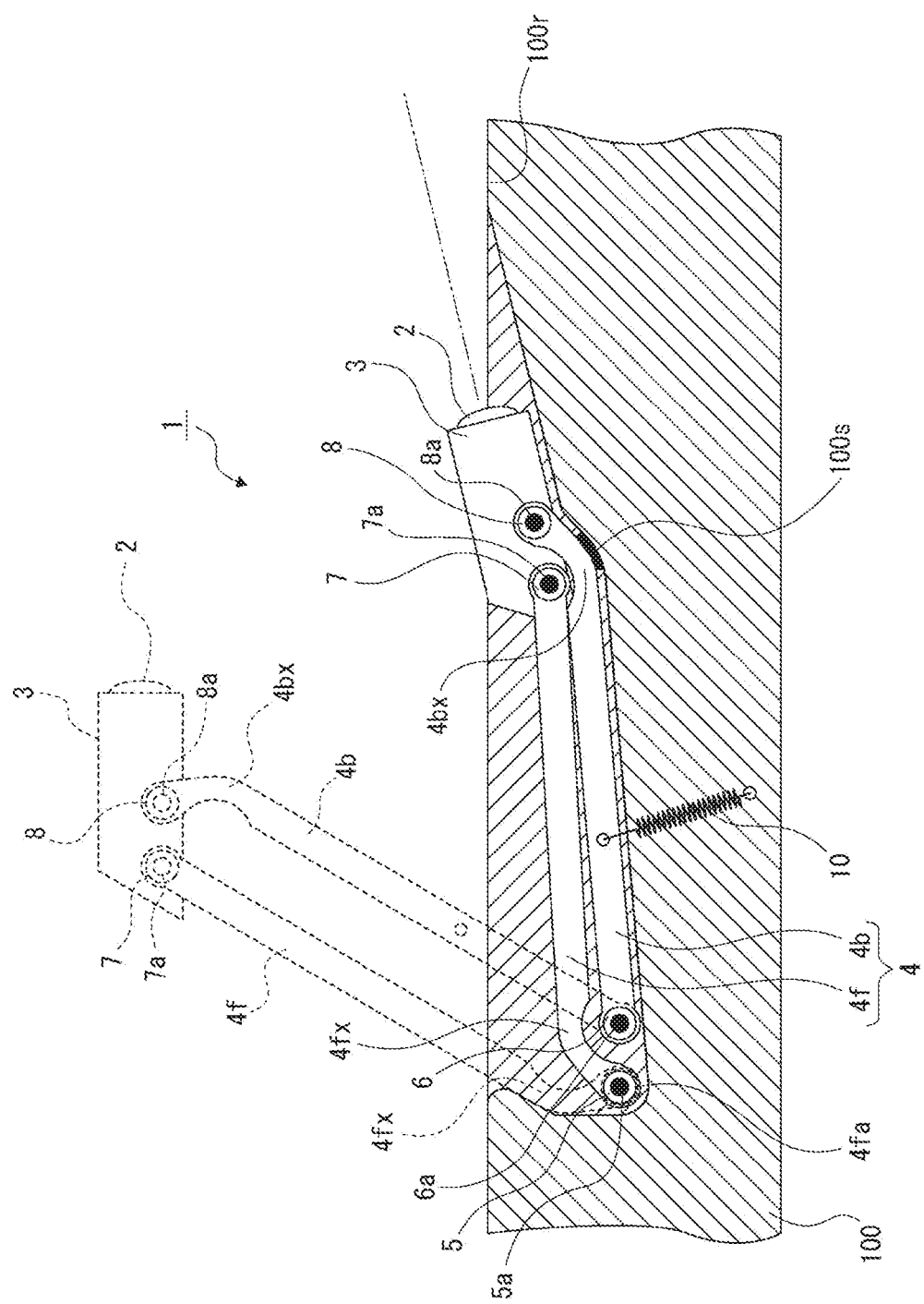
FIG. 12 is a top view showing the schematic configuration of the imaging unit support apparatus in which the retreat position of the supported portion is within the vehicle.

FIG. 12 shows the schematic configuration of the imaging unit support apparatus 1 in the case where the retreat position of the supported portion 3 is inside the vehicle 100 (such as a recessed portion of a body of the motorized vehicle) in a top view similarly to FIG. 2. Note that in FIG. 12, illustration of the cover portion 9 is omitted. Further, in FIG. 12, the supported portion 3 (the imaging unit 2), the front side supporting member 4f, the rear side supporting member 4b, the vehicle side connection portions 5 and 6, and the supported portion side connection portions 7 and 8 when the supported portion 3 is located at the normal position are represented by dotted lines, and the respective portions when the supported portion 3 is located at the retreat position are represented by a solid line.

On the imaging unit support apparatus 1 in this case, a regulation portion 100s that regulates the pivot of the rear side supporting member 4b in the retreat direction when a part of the supported portion 3 is located inside the vehicle 100 is formed on the side of the vehicle 100.

Note that the vicinity of the end portion of the front side supporting member 4f on the side of the vehicle 100 is curved to project toward the direction opposite to the retreat direction, and the curved portion is formed as a curved portion 4fx. In addition, the vicinity of the end portion of the rear side supporting member 4b on the side of the supported portion 3 is curved to project toward the retreat direction, and the curved portion is formed as a curved portion 4bx.

Because the curved portions 4fx and 4bx are formed, the front side supporting member 4f and the rear side supporting member 4b can be pivoted in the retreat direction until a substantial parallel relationship between a line connecting central points between the axial members 5a and 6a and a line connecting central points between the axial members 7a and 8a is eliminated. The regulation portion 100s is placed at a position where the pivot of the rear side supporting member 4b is stopped after this substantial parallel relationship is eliminated.

Along with the pivot of the front side supporting member 4f and the rear side supporting member 4b in the retreat direction after the above-mentioned substantial parallel relationship is eliminated, the orientation (such as an optical axis) of imaging performed by the imaging unit 2 is gradually changed to the orientation that moves away from the vehicle 100 (changed from the rear to the diagonally right rear in this example).

Accordingly, it is possible to prevent the entire imaging field of view from being blocked by the vehicle even if a retreat operation in which the supported portion is caused to retreat in the vehicle 100 is performed. Specifically, it is possible to improve the safety by reducing the amount of external projection of the retreated supported portion 3 from the vehicle 100 and ensure the field of view outside the vehicle after the retreat of the supported portion at the same time.

Note that the configuration for enabling the front side supporting member 4f and the rear side supporting member 4b to pivot until the above-mentioned substantial parallel relationship is eliminated is not limited to the formation of the curved portions 4fx and 4bx, and another configuration may be employed, e.g., the front side supporting member 4f and the rear side supporting member 4b may be located at different height positions.

Further, in the case where the configuration according to the second example shown in FIG. 11 is employed, the contact surfaces of the fan-shaped member 29, the fan-shaped member 30, and the circular-shaped member 31 do not necessarily need to have a circular arc shape, and may have a variable cam shape whose curvature is changed by a predetermined amount of pivot of the supporting member 4r in the retreat direction. Accordingly, similarly to the case of FIGS. 14A and 14B, it is possible to change the orientation of the imaging direction to the orientation that moves away from the vehicle 100.

Further, in the above, the function of avoiding collision from the front has been described.

However, a function of avoiding collision from the rear may be provided.

Figure 13:
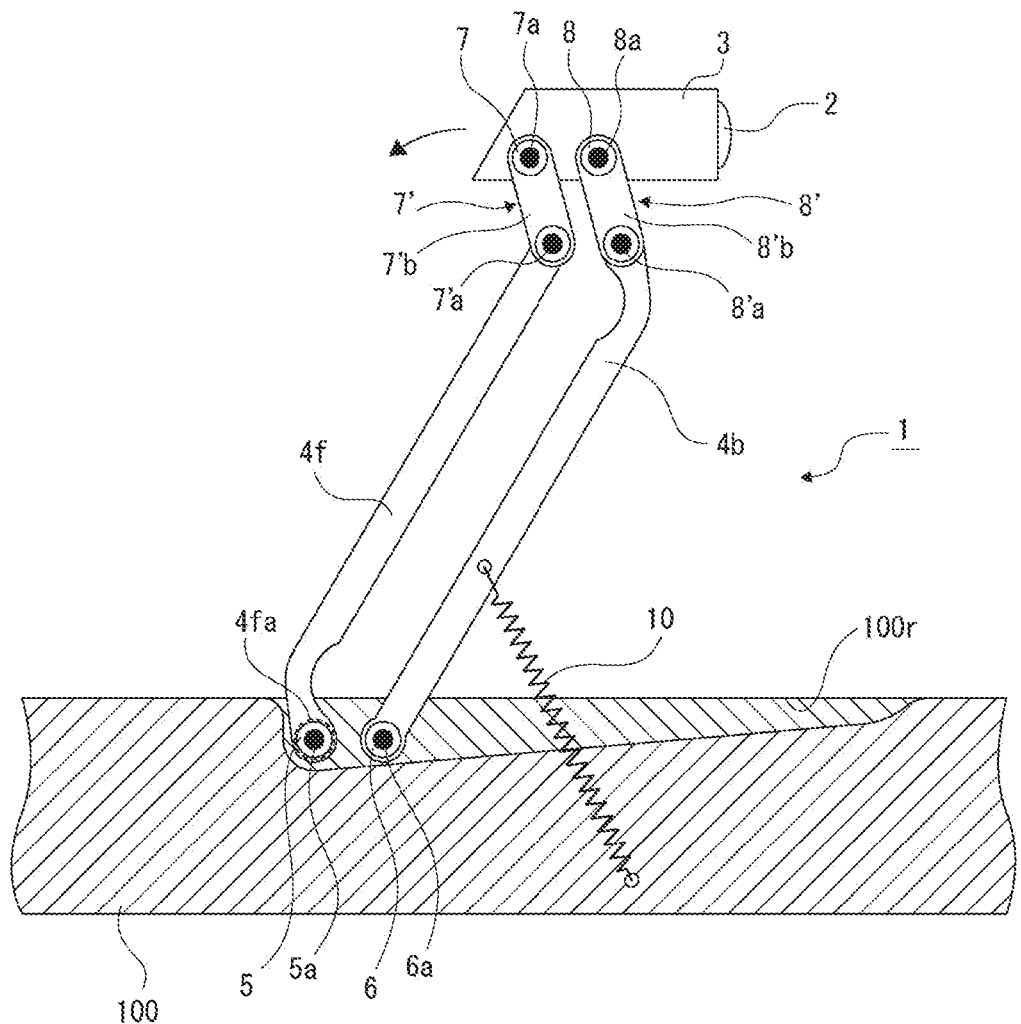
FIG. 13 is a top view showing the schematic configuration of the imaging unit support apparatus having a function of rear end collision avoidance.

FIG. 13 shows a schematic configuration example of the imaging unit support apparatus 1 in this case in a top view similarly to FIG. 2. In this case, a multijoint member is used for the connection portion on the side of the supported portion 3. Specifically, instead of the supported portion side connection portions 7 and 8, a supported portion side connection portion 7' including the axial member 7a, an axial member 7'a, and a coupling portion 7'b, and a supported portion side connection portion 8' including the axial member 8a, an axial member 8'a, and a coupling member 8'b are provided.

Also in this case, the lower ends of the axial members 7a and 8a are fixed to the supported portion 3, the axial member 7a is inserted into a through-hole formed on one end portion (end portion on the side of the supported portion 3) of the coupling portion 7'b, and the axial member 8a is inserted into a through-hole formed on one end (end portion on the side of the supported portion 3) of the coupling member 8'b. The lower end of the axial member 7'a is fixed to the other end portion of the coupling portion 7'b, and is inserted into a through-hole formed on the end portion of the front side supporting member 4f on the side of the supported portion 3. On the other hand, the lower end of the axial member 8'a is fixed to the other end of the coupling member 8'b, and is inserted into a through-hole formed on the end portion of the rear side supporting member 4b on the side of the supported portion 3.

Note that in the imaging unit support apparatus 1 in this case, lines including not only a line connecting central points of the axial member 5a and 6a and a line connecting central points of the axial member 7a and 8a but also a line connecting central points of the axial member 7'a and 8'a are substantially in parallel with each other in a top view. Note that the axial member 7'a and the axial member 8'a may be coupled to each other with a coupling member.

By the above-mentioned supported portion side connection portion 7' and 8', the coupling portion 7'b and the coupling member 8'b pivot in the direction opposite to the retreat direction (in the direction shown by an arrow in FIG. 13) and the supported portion 3 is driven in the direction approaching to the vehicle 100 when an external force from the rear is applied to the supported portion 3. Accordingly, the function of avoiding collision from the rear is achieved.

If the avoidance function described in FIG. 13 is not provided, the supported portion 3 may fall off or may be damaged by the reaction force of the input from the rear in the case where the supported portion 3 is caught in an obstacle such as a side wall when the vehicle 100 moves backward. This can be prevented by the avoidance function described in FIG. 13. Further, if the avoidance function described in FIG. 13 is not provided, the supported portion 3 is displaced from the normal position to the position mostly away from the vehicle 100 when an object such as a two-wheeled vehicle, which approaches from the rear, collides with the supported portion 3. This displacement causes the collision object to be easily caught in the supported portion 3, and the collision object may be overturned when the collision object is a two-wheeled vehicle. By providing the avoidance function shown in FIG. 13, it is possible to prevent or reduce such danger.

Note that in the configuration shown in FIG. 13, it is desirable to provide a locking mechanism that locks the movement of at least one of the coupling portion 7'b and 8'b until a drive force that acts on the coupling portions 7'b and 8'b in response to collision from the rear becomes a predetermined drive force or more. At this time, because the external force from the rear applied by wind pressure or the like is assumed to be less than the external force from the front, the locking mechanism is configured to perform unlocking in response to an input of relatively small external force. Accordingly, the supported portion 3 easily retreats in response to collision form the rear, and thus, it is possible to improve the safety.

2. Second Embodiment

The movement direction of the supporting portion when the supported portion 3 is caused to retreat in a second embodiment is different from that in the first embodiment.

An imaging unit support apparatus 1B according to the second embodiment will be described with reference to FIGS. 14A and 14B.

Figure 14A:
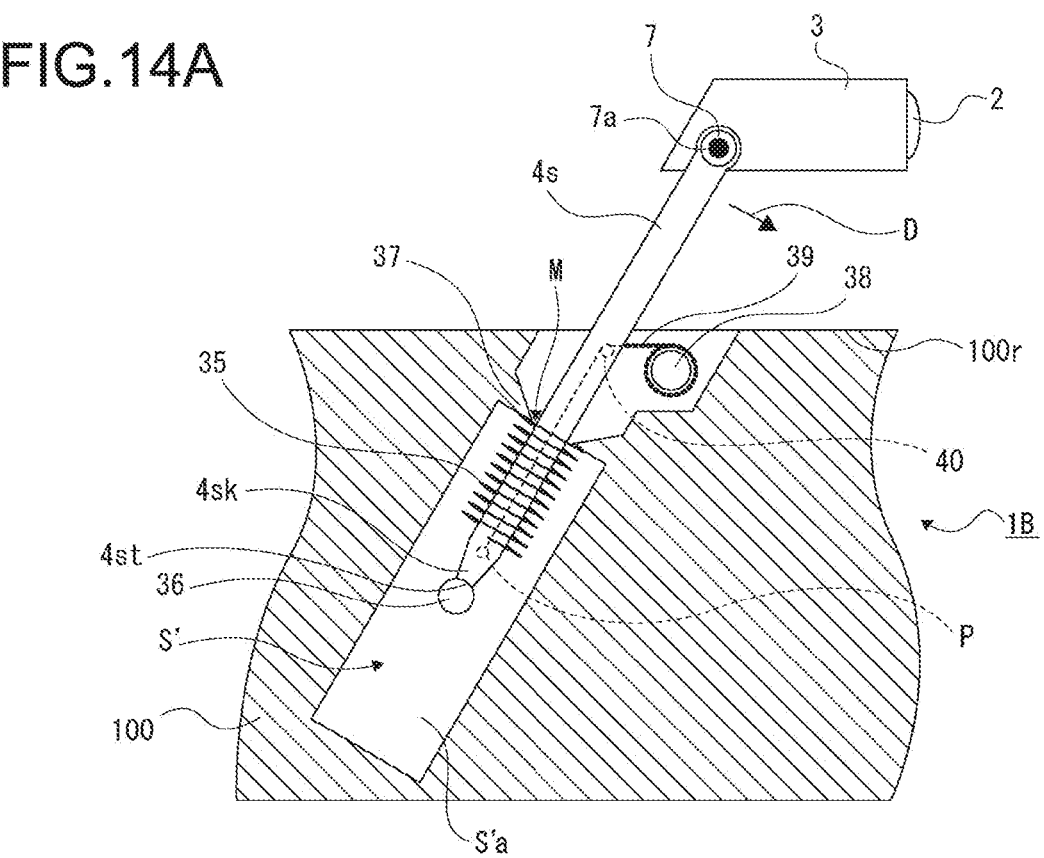
FIG. 14A is a schematic configuration diagram showing the mechanical schematic configuration of the imaging unit support apparatus according to a second embodiment.
Figure 14B:
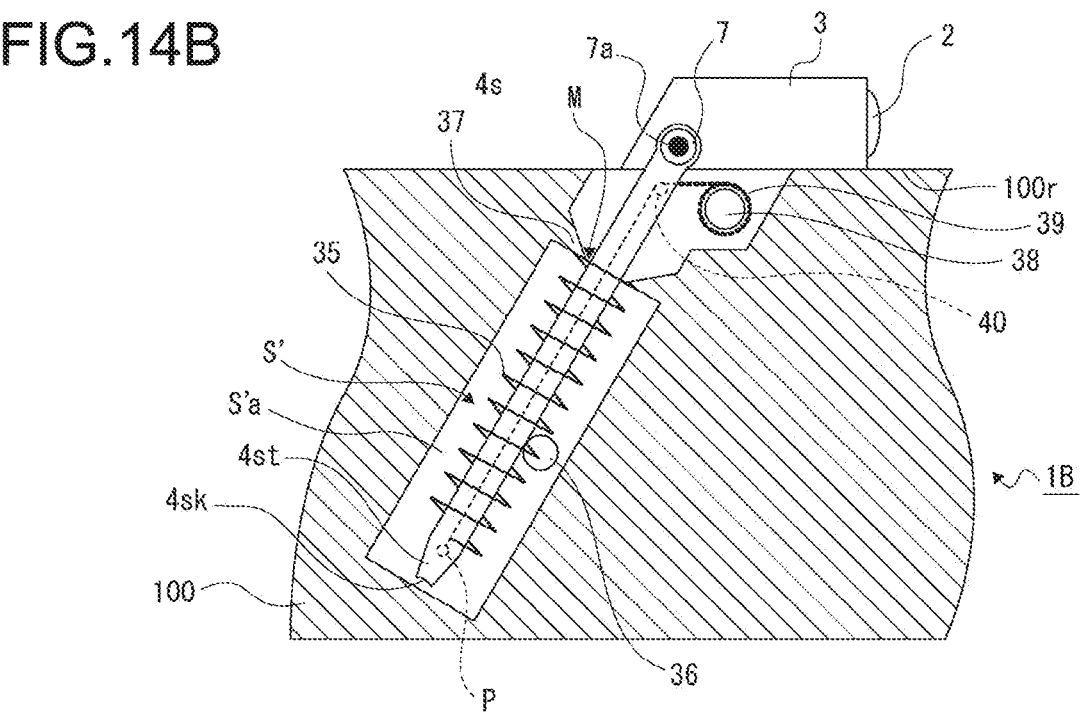
FIG. 14B is a schematic configuration diagram showing the mechanical schematic configuration of the imaging unit support apparatus according to the second embodiment.

FIGS. 14A and 14B are each a schematic configuration diagram showing the mechanical schematic configuration of the imaging unit support apparatus 1B. FIG. 14A shows the state where the supported portion 3 is located at the normal position, and FIG. 14B shows the state where the supported portion 3 is located at the retreat position, in a top view similarly to FIG. 2.

The imaging unit support apparatus 1B includes a bar-shaped supporting member 4s (such as an extendable arm) having a substantially cylindrical shape, a biasing member 35 including an elastic body having an elongation force such as a compressed coil spring, a locking member 36 having a substantially spherical shape, a regulation portion 37, an axial member 38, a drawing member 39, and a guide member 40 as well as the imaging unit 2 and the supported portion 3. One end portion of the supporting member 4s is connected to the supported portion 3 via the supported portion side connection portion 7, and the other end portion (hereinafter, referred to as "the vehicle side end portion") of the supporting member 4s is a tapered portion 4st formed in a tapered shape. The tip surface of the tapered portion 4st is a receiving surface 4sk formed in a shape that is capable of being close contact with the locking member 36 (see, particularly, FIG. 14B).

In the vehicle 100 in this case, a space S' is formed. The space S' is connected to the space outside the vehicle 100, and the supporting member 4s can be inserted into the space S'. A partial cross-sectional area of the space S' (cross-sectional area on the surface perpendicular to the insertion direction of the supporting member 4s) is the smallest because of the existence of the regulation portion 37 formed in the vehicle 100. Hereinafter, the part whose cross-sectional view is the smallest is referred to as "the opening M." The opening M has, for example, a circular shape, and the diameter of the opening M is slightly larger than the diameter of the supporting member 4s.

Hereinafter, an area in the space S', which is closer to the laterally central portion of the vehicle 100 than the opening M, is referred to as the back side space S'a.

For the biasing member 35, a compressed coil spring is used in this example. The biasing member 35 is located in the back side space S'a, and the supporting member 4s is inserted into the space that is formed inside the coil and has a substantially cylindrical shape. One end of the biasing member 35 is fixed to the vicinity of the tapered portion 4st of the supporting member 4s, and the other end of the biasing member 35 is brought into contact with the regulation portion 37.

The locking member 36 is provided in the back side space S'a, and located at a position where the locking member 36 is brought into close contact with the receiving surface 4sk of the supporting member 4s when the supported portion 3 is located at the normal position (FIG. 14A). When the locking member 36 is brought into close contact with the receiving surface 4sk, the locking member 36 locks the supporting member 4s biased toward the laterally central portion of the vehicle 100 by the biasing member 35. Hereinafter, the position of the locking member 36 in the locking state shown in FIG. 14A is referred to as "the locked position."

Note that the locking member 36 is held so that the locking member 36 is not capable of moving from the locked position to the front side and is capable of moving from the locked position to the rear side by a movable holding mechanism (not shown) provided to the vehicle 100. Further, the locking member 36 is biased to the front side by a biasing member (not shown) provided to the vehicle 100.

The axial member 38 is formed in a substantially cylindrical shape, and is located to be closer to the right side surface 100r than the back side space S'a in the vehicle 100.

The drawing member 39 includes a substantially linear member having a flexibility such as a chain. One end of the drawing member 39 is fixed to the side surface (surface in the direction around an axis) of the axial member 38, and the other end of the drawing member 39 is fixed to a position in the vicinity of the tapered portion 4st in the supporting member 4s, which is represented by "P" in FIGS. 14A and 14B. At this time, the drawing member 39 is guided by the guide member 40 provided in the vehicle 100, and is fixed to a position in the vicinity of the tapered portion 4st through below the supporting member 4s.

In the imaging unit support apparatus 1B having the above-mentioned configuration, the supporting member 4s is inclined to the rear side as shown by an arrow D in FIG. 14A with the edge of the opening M as a fulcrum point in the case where an object collides with the supporting member 4s or the supported portion 3 from the front when the supported portion 3 is located at the normal position. Specifically, the tapered portion 4st of the supporting member 4s is displaced from the position shown in FIG. 14A to the front side.

Accordingly, the state where the locking member 36 is brought into close contact with the receiving surface 4sk, i.e., the locked state of the supporting member 4s is released.

When the locked state is released, the supporting member 4s starts to move toward the substantially central direction of the vehicle 100 on the basis of the biasing force of the biasing member 35. At this time, the locking member 36 is pushed to the rear by the tapered portion 4st along with the movement of the supporting member 4s.

Further, along with the movement of the supporting member 4s, the supported portion 3 is driven in the direction approaching to the vehicle 100, and finally located at the retreat position shown in FIG. 14B.

Because the imaging unit support apparatus 1B includes the axial member 38 and the drawing member 39, it is possible to return the position of the supported portion 3 from the retreat position shown in FIG. 14B to the normal position shown in FIG. 14A.

Also in this case, it is possible to achieve a return operation with an operation input performed by a driver or the like. In this case, the imaging unit support apparatus 1B only has to include the control unit 20, the operation unit 21, and the motor 22 shown in FIG. 6. At this time, the rotation shaft of the motor 22 only has to be mechanically coupled to the axial member 38, and the axial member 38 only has to be rotated in synchronization with rotation of the motor 22.

When the axial member 38 is rotated in the state shown in FIG. 14B, the drawing member 39 is rolled up by the axial member 38, and the supporting member 4s is driven in the direction opposite to that at the time of retreat (in the return direction) in accordance therewith.

Accordingly, it is possible to return the supported portion 3 to the normal position.

Note that because the locking member 36 is biased to the front side as described above, the locking member 36 is returned to the locked position along with the movement of the supporting member 4s in the return direction than the position shown in FIG. 14A at the time of return. When the rotary driving of the axial member 38 by the motor 22 is stopped after the locking member 36 is returned to the locked position as described above, the supporting member 4s is returned in the retreat direction by the biasing force of the biasing member 35, and the locking member 36 is brought into close contact with the receiving surface 4sk. Specifically, an operation of causing the supporting member 4s to be in the locked state along with the return is achieved.

Note that although the case where the supported portion side connection portion 7 is provided and the supported portion 3 is capable of pivoting with the axial member 7a as an axis has been illustrated in the above-mentioned example, the supported portion 3 does not necessarily need to be capable of pivoting. In the case where the supported portion side connection portion 7 is provided as shown in FIGS. 14A and 14B, it is advantageous that the orientation of the supported portion 3 can be manually or electrically controlled.

Note that in the imaging unit support apparatus 1B, the configuration for locking and unlocking the supporting member 4s is not limited to the illustrated configuration using the locking member 36.

Figure 15:
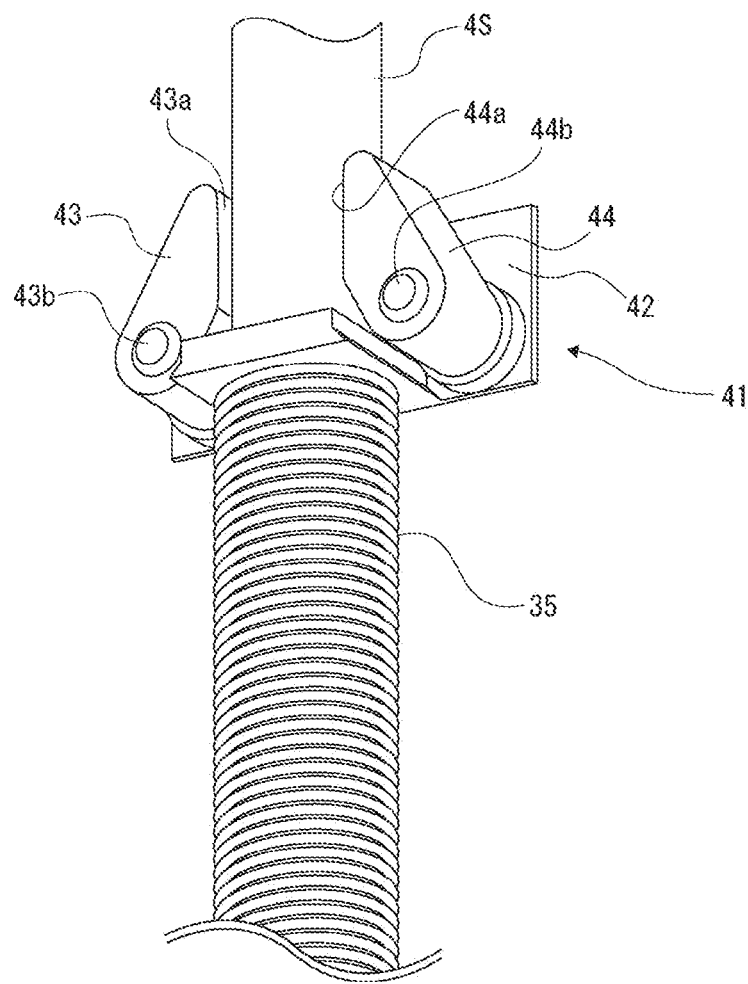
FIG. 15 is a diagram describing a modified example of the configuration for locking and unlocking in the second embodiment.

For example, a locking/unlocking portion 41 shown in FIG. 15 may be used. Note that in FIG. 15, the left side of the sheet corresponds to the front side, and the right side of the sheet corresponds to the rear side.

The locking/unlocking portion 41 includes a base place 42, and a front side movable member 43 and a rear side movable member 44 formed on the base plate 42. The base plate 42 is fixed to the vehicle 100. The front side movable member 43 and the rear side movable member 44 respectively have a flat surface 43a and a flat surface 44a, and respectively freely pivot with an axial portion 43b and an axial portion 44b. Further, the front side movable member 43 and the rear side movable member 44 are biased in the direction approaching each other.

In FIG. 15, the positional relationship between the supporting member 4s, the front side movable member 43, and the rear side movable member 44 in the locked state is shown. In the locked state, with the flat surface 43a and the flat surface 44a that are in parallel with each other, the front side movable member 43 and the rear side movable member 44 hold the supporting member 4s so as to sandwich it. At this time, because the flat surface 43a and the flat surface 44a are in parallel with each other, the flat surface 43a and the flat surface 44a are in surface contact with the supporting member 4s, and block the movement of the supporting member 4s with the frictional resistance.

On the other hand, it is difficult to maintain the state where the flat surface 43a and the flat surface 44a are in parallel with each other when the supporting member 4s is inclined in response to collision of an object. As a result, the contact of the flat surface 43a and the flat surface 44a with the supporting member 4s becomes partially a point contact, a force for holding the supporting member 4s with respect to the biasing force of the biasing member 35 is reduced, and thus, the supporting member 4s moves in the retreat direction. Specifically, the locked state of the supporting member 4s is released.

3. Third Embodiment

An imaging unit support apparatus 1C according to a third embodiment will be described.

Figure 16A:
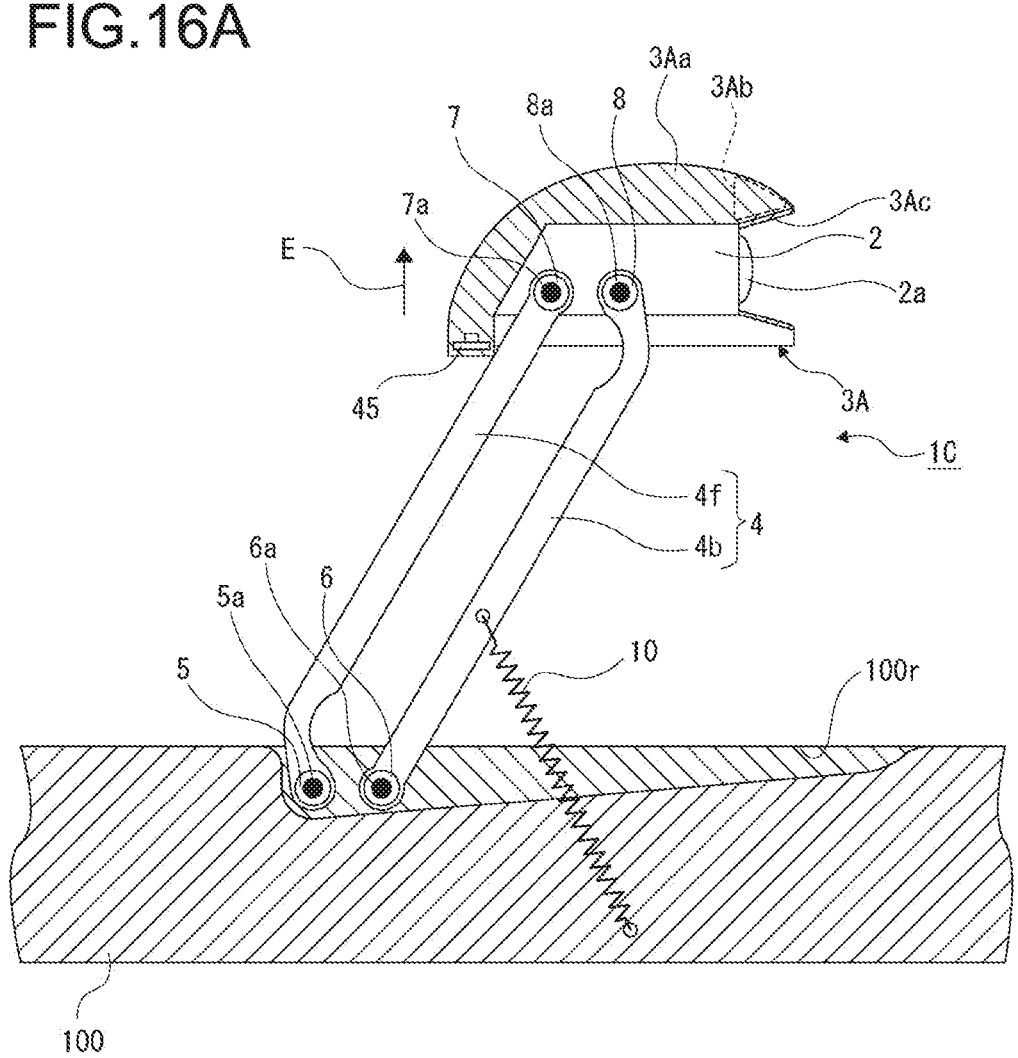
FIG. 16A is a diagram describing the mechanical schematic configuration of an imaging unit support apparatus according to a third embodiment.
Figure 16B:
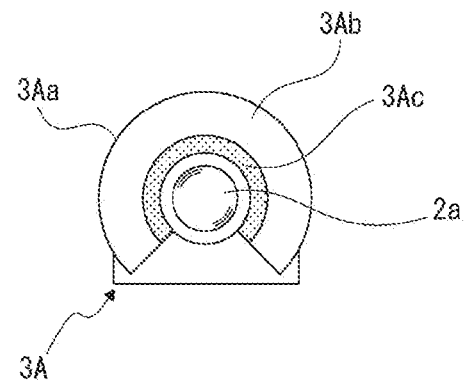
FIG. 16B is a rear view showing a supported portion of the imaging unit support apparatus.

FIG. 16A shows the mechanical schematic configuration of the imaging unit support apparatus 1C in a top view similarly to the case of FIG. 2. FIG. 16B shows a supported portion 3A of the imaging unit support apparatus 1C in a rear view.

Note that although the imaging unit support apparatus 1C includes the cover portion 9 similarly to the imaging unit support apparatus 1, illustration thereof is omitted in FIGS. 16A and 16B. Further, in FIG. 16B, illustration of the biasing member 10 is omitted.

In the third embodiment, an imaging lens of the imaging unit 2 is referred to as "the imaging lens 2a."

The imaging unit support apparatus 1C is different from the imaging unit support apparatus 1 in that the imaging unit support apparatus 1C includes the supported portion 3A instead of the supported portion 3.

In FIG. 16A, the supported portion 3A and the imaging unit 2 held by the supported portion 3A are shown by the cross-section obtained by cutting the supported portion 3A and the imaging unit 2 in parallel with the horizontal surface at the substantially central position of the supported portion 3A in the vertical direction.

The supported portion 3A includes a transparent member 3Aa that covers the imaging unit 2 in the direction substantially around the axis of the imaging lens 2a, a light emitting portion 3Ab formed as a part of the transparent member 3Aa, a hood portion 3Ac that covers the outer periphery of the imaging lens 2a in the direction around the axis of the imaging lens 2a and is brought into contact with the rear end of the transparent member 3Aa, and a light source 45 for the light emitting portion 3Ab.

The light source 45 includes a light emitting element such as an LED (light emitting diode), and is located at a position where the light source 45 is capable of causing light emitted from the light emitting element to enter the transparent member 3Aa. In this example, the position of the light source 45 is located closer to the vehicle 100 than the imaging unit 2. The direction of light emitted from the light source 45 is the substantially right direction as shown by an arrow E in FIG. 16A.

Note that although an electric power supply line for supplying drive electric power to the light source 45 is disposed on the supported portion 3A from the side of the vehicle 100 in the third embodiment, illustration thereof is omitted in FIG. 16A.

The transparent member 3Aa includes a transparent material having a light transmissive property such as transparent resin and quartz.

The transparent member 3Aa is designed to guide the light beam entered from the light source 45 to the rear end portion while causing the light to be totally reflected on the interface.

Specifically, the transparent member 3Aa is designed so that the incidence angle of the light beam on the interface is equal to or larger than a predetermined angle (critical angle) by a similar principle to that of the optical fiber, and the light beam emitted from the light source 45 is transmitted to the rear in the transparent member 3Aa while the light beam is repeatedly totally reflected (so-called multiple reflection) on the interface of the transparent member 3Aa.

The transparent member 3Aa is formed so that light is not totally reflected on the interface of at least a part of the rear end portion of the transparent member 3Aa, which is formed as the light emitting portion 3Ab. Specifically, because light is not totally reflected on the interface, light guided to the rear in the transparent member 3Aa leaks to the outside at the light emitting portion 3Ab. Specifically, light having directivity to the rear is emitted from the light emitting portion 3Ab.

Note that in the case where there is a portion where it may be impossible or difficult to cause light to be totally reflected on the interface on designing, a light reflection film (e.g., aluminum deposition film) may be additionally formed on the portion.

Further, the light emitting portion 3Ab does not necessarily need to be formed as a part where light is not totally reflected on the interface as described above. For example, the light emitting portion 3Ab may include an optical component such as a diffraction grating, a prism having directionality, and a Fresnel lens.

The light emitting portion 3Ab emits light having directionality to the rear side as described above. Accordingly, it is possible to demonstrate the existence of the supported portion 3A (the imaging unit 2) located outside the vehicle 100 for a person such as a driver of a two-wheeled vehicle located behind, and prevent the person from colliding with the supported portion 3A.

Note that although the configuration in which light is emitted to only the rear side is illustrated in the above, it is also possible to provide the light emitting portion 3Ab also to the front side to prevent the collision from the front. In this case, the transparent member 3Aa is designed so that light emitted from the light source 45 is guided to the front side.

Note that the light emitting portion 3Ab only has to be formed at a position where light is emitted from at least a part of the outer periphery of the imaging unit 2. Accordingly, it is possible to demonstrate the existence of the imaging unit 2 located outside the vehicle 100 for a person around the vehicle, and prevent the person from colliding with the imaging unit 2.

Note that the light emission state of the light emitting portion 3Ab may be switched in synchronization with the movement of the supporting portion 4.

Figure 17A:
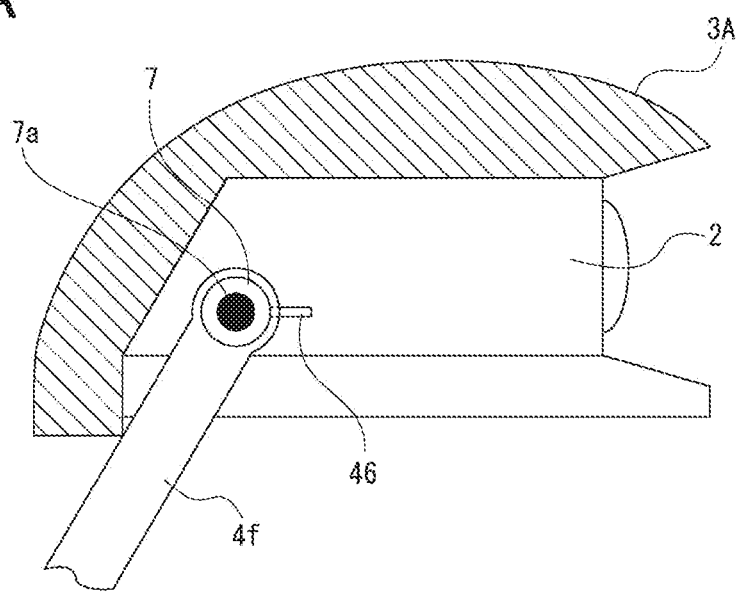
FIG. 17A is an explanatory diagram of an example of a switching mechanism.

A switching mechanism that switches the light emission state of the light emitting portion 3Ab in synchronization with the movement of the supporting portion 4 will be described with reference to FIGS. 17A and 17B. FIG. 17A schematically shows the positional relationship between the supported portion 3A and the front side supporting member 4f when the supported portion 3A is located at the normal position, and FIG. 17B schematically shows the positional relationship between the supported portion 3 and the front side supporting member 4f when the supported portion 3A is located at the retreat position.

The switching mechanism in this case includes a trigger member 46 formed in the vicinity of the end portion of the lower surface of the front side supporting member 4f on the side of the supported portion 3A. The trigger member 46 is formed as a member extending in the radial direction of the axial member 7a.

Figure 17B:
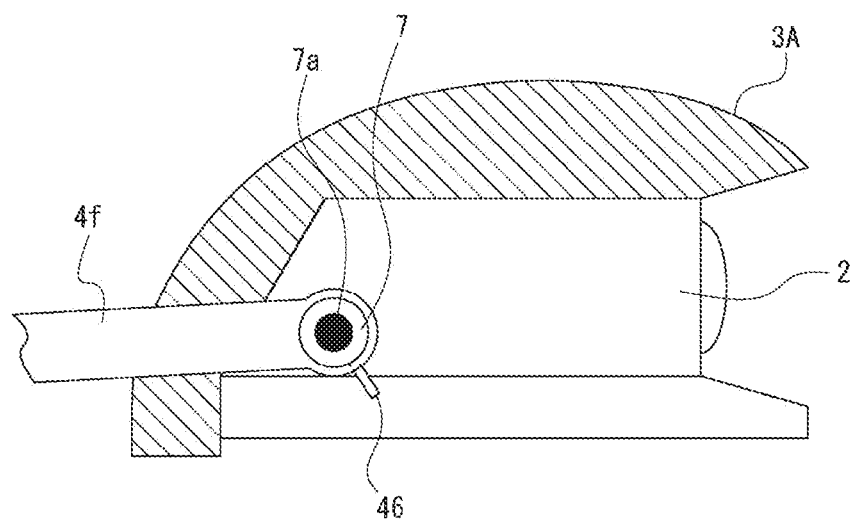
FIG. 17B is an explanatory diagram of an example of a switching mechanism.

As can be seen by comparing FIG. 17A and FIG. 17B, the position of the trigger member 46 with respect to the supported portion 3A is changed along with the movement of the supported portion 3A between the normal position and the retreat position. Hereinafter, the position of the trigger member 46 when the supported portion 3A is located at the normal position and the retreat position is respectively referred to as "the first position" and "the second position."

As such a configuration for switching the light emission state of the light source 45 in synchronization with the change in position of the trigger member 46 between the first position and the second position, for example, the following configuration can be employed.

Specifically, a configuration including an electronic switch that turns on drive electric power supply to the light source 45 when the trigger member 46 is located at the first position and turns off the drive electric power supply to the light source 45 when the trigger member 46 is located at the second position can be employed.

Accordingly, an operation in which the light emission state of the light emitting portion 3Ab is maintained when the supported portion 3A is located at the normal position, and the state of the light emitting portion 3Ab is switched to a non-light emission state in response to the movement of the supported portion 3A to the retreat position can be achieved.

Note that the position of the trigger member 46 for switching the state of the light emitting portion 3Ab to the non-light emission state does not necessarily need to be the above-mentioned second position. Specifically, the timing of switching the state of the light emitting portion 3Ab to the non-light emission state may be an arbitrary timing of when the trigger member 46 is displaced from the first position to the second position.

Further, the trigger member 46 does not necessarily need to be provided to the front side supporting member 4f, and may be provided to the rear side supporting member 4b.

Further, switching of the light emission state of the light emitting portion 3Ab by the switching mechanism may include switching of the amount of light (including stepless switching) instead of switching between light emission and non-light emission of the light source 45. For example, a configuration in which the amount of light emitted from the light source 45 is gradually decreased or increased depending on the amount of displacement of the trigger member 46 when the supported portion 3A moves between the normal position and the retreat position is conceivable.

Further, as the switching mechanism, a configuration in which the light emission state of the light source 45 is switched in synchronization with the unlocking performed by the unlocking member 11 may be employed.

4. Modified Example

The above-mentioned configuration of the imaging unit support apparatus is merely an example. For example, various modified example described below may be employed.

For example, in the above, the configuration in which the supporting portion retreats in response to the collision of an object is illustrated. However, a configuration in which a retreat control unit that causes the supporting portion to retreat on the basis of the results obtained by predicting collision of an object is provided may be employed.

Figure 18:
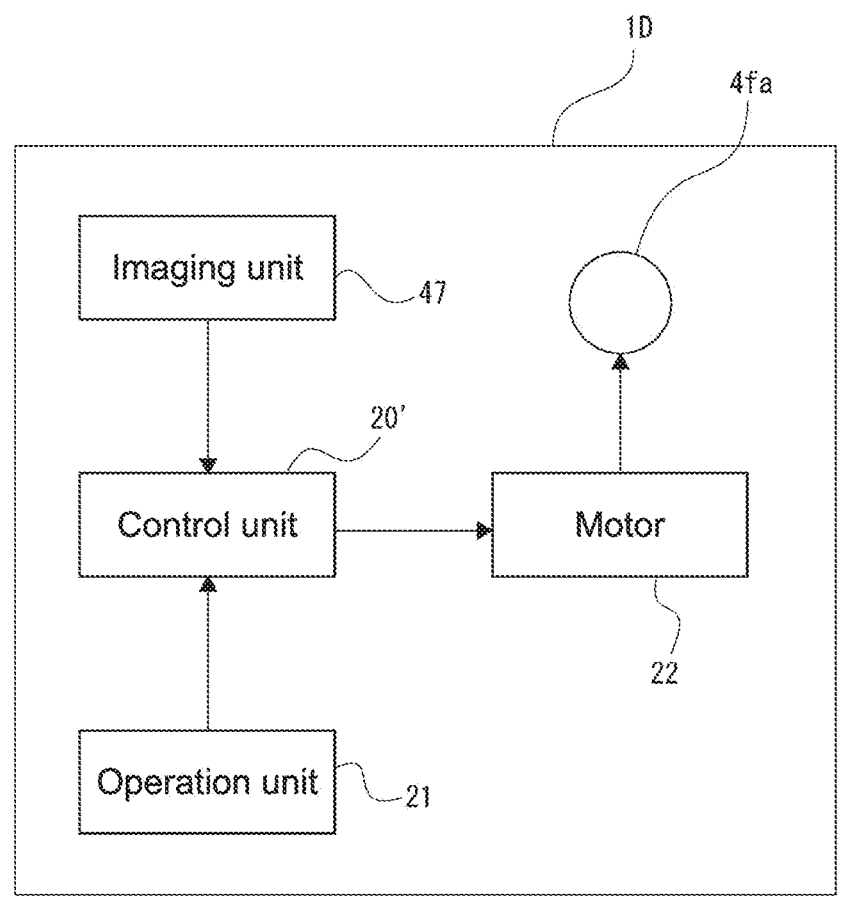
FIG. 18 is a block diagram showing the electrical circuit configuration of the imaging unit support apparatus including an avoidance control unit.

FIG. 18 is a block diagram showing the electrical circuit configuration of an imaging unit support apparatus 1D including the above-mentioned retreat control unit.

Note that the mechanical configuration of the imaging unit support apparatus 1D is similar to that of the imaging unit support apparatus 1.

The imaging unit support apparatus 1D is different from the imaging unit support apparatus 1 in that a control unit 20' is provided instead of the control unit 20, and an imaging unit 47 is further provided.

The imaging unit 47 is provided to the supported portion 3 in a direction for picking up an image of the front. Note that the imaging unit 47 only has to be located in the vicinity of the supported portion 3. The position of the imaging unit 47 is not limited to a specific mounting position. For example, the imaging unit 47 may be mounted to the vehicle 100.

The control unit 20' includes an electronic circuit such as a microcomputer including a CPU (Central Processing Unit), a ROM (Read Only Memory), and a RAM (Random Access Memory), for example. The control unit 20' performs processing of inputting data of an image picked up by the imaging unit 47 (data of a front picked-up image), performing image analysis on the picked-up image data, and predicting collision of an object from the front. For example, the prediction processing in this case is performed as processing of obtaining a prediction result in which there is a risk of collision of an object because the proportion of the object estimated as the same subject in the frame of a picked-up image is equal to or larger than a predetermined proportion.

In the case where a prediction result in which there is a risk of collision of an object is obtained, the control unit 20' controls the motor 22 to drive the driven unit 4*fa* to be rotated in the retreat direction.

Accordingly, the supported portion 3 is driven in the retreat direction in response to the prediction of the risk of collision of an object from the front.

Therefore, it is possible to prevent collision of an object from the front.

Note that the sensor used for predicting the collision of an object is not limited to an image sensor, and another sensor such as a sonar, a millimeter wave radar, a laser radar, and an electrostatic capacitance sensor can be used.

Further, the configuration of the retreat control unit can be applied not only to the imaging unit support apparatus 1 but also to the various imaging unit support apparatuses described in the first to third embodiments, for example. Note that when the configuration is applied to the second embodiment, it only has to cause the supporting member 4*s* to be inclined in the direction represented by the arrow D shown in FIG. 14A or the locking member 36 to move to the rear by the motor 22 in response to the prediction of collision of an object.

Note that although an example in which the supported portion 3 is driven to retreat in response to the prediction of collision of an object from the front has been described in the above, the supported portion 3 may be driven to retreat in an retreat direction opposite to the retreat direction at the time of the collision of an object from the front in response to the prediction of collision of an object from the rear.

In this case, the control unit 20' predicts collision of an object from the rear on the basis of picked-up image data obtained from the imaging unit 2 that picks up an image of the rear. Then, in the case where a prediction results in which there is a risk of collision of an object from the rear is obtained, the motor 22 is controlled to drive the driven unit 4*fa* to be rotated in the direction opposite to that in the above-mentioned case.

Accordingly, it is possible to prevent collision of an object from the rear.

Note that the function of retreating in response to the external force from the rear described in FIG. 13 may be provided in addition to the above-mentioned function of preventing collision of an object on the basis of collision prediction. Accordingly, it is possible to improve the safety when the prediction of collision from the rear fails.

Further, it is possible to perform processing of predicting collision from the side of the vehicle 100 (when the lateral distance between an obstacle such as another parked vehicle and a wall and the vehicle 100 is decreased at the time of parking in a garage, for example) in addition to the prediction of collision from the front and the rear, and drive the supported portion 3 in the retreat direction in response to the prediction of collision.

Further, although an example in which the light emission state of the light emitting portion 3Ab is switched in synchronization with the movement of the supporting portion 4 has been described in the third embodiment, a configuration in which the light emission state of the light emitting portion 3Ab is switched on the basis of light and dark correlation information correlated with light and dark of outside light may be employed.

Examples of the light and dark correlation information include a detection signal of an image sensor or a photo sensor (outside light sensor) and time information obtained from a GNSS (Global Navigation Satellite System) or the like. For example, it is possible to switch the light emission state of the light emitting portion 3Ab from on to off when it is determined that outside light is relatively dim on the basis of the light and dark correlation information. Alternatively, a configuration in which the mount of light emitted from the light emitting portion 3Ab is switched depending on the degree of outside light may be employed.

Further, in the imaging unit support apparatus described in each embodiment, the imaging unit 2 may be detachably attached to the supported portion 3 (or 3A). In other words, the supported portion 3 may include an attaching/detaching mechanism for the imaging unit 2.

Accordingly, the imaging unit 2 can be replaced when the imaging unit 2 is not working, for example.

Further, the cover portion 9 may be detachably attached to the imaging unit support apparatus described in each embodiment Further, in the imaging unit support apparatus described in each embodiment, the supported portion 3 or the supported portion 3A may be configured to look bigger than it really is by a Trompe l'oeil effect (illusion effect).

4. Summary of Embodiments

As described above, the imaging unit support apparatuses (1, 1A, 1B, 1C, and 1D) according to the embodiments each include the supported portion (3 or 3A) on which the imaging unit is placed and the supporting portion (4) that supports the supported portion.

Further, the imaging unit support apparatuses each include the holding portion (the vehicle side connection portions 5 and 6, and the supported portion side connection portions 7, 8, 7', and 8', or the biasing member 35, the locking member 36, and the regulation portion 37, or the locking/unlocking portion 41) that displaceably holds the supporting portion from the side of the vehicle so that the supported portion moves between the normal position that is relatively away from the vehicle and the retreat position that is relatively close to the vehicle, and the supporting portion is driven in response to collision of an object or as an operation of avoiding collision when the supported portion is located at the normal position, thereby causing the supported portion to move from the normal position to the retreat position.

Accordingly, the supported portion is caused to move from the normal position to the retreat position in response to collision of an object or before collision of an object.

Therefore, in the imaging unit support apparatus that supports, from the side of the vehicle, the imaging unit located outside the vehicle, it is possible to ensure the safety against collision.

Further, when the drive direction of the supporting portion that causes the supported portion to move to the retreat position is referred to as the retreat direction, the imaging unit support apparatus according to the embodiment includes the locking mechanism (the locking portion 9*m*, the first magnet 25, and the second magnet 26, or the locking member 36, or the locking/unlocking portion 41) that locks the movement of the supporting portion in the retreat direction.

Accordingly, it is possible to prevent the supported portion (the imaging unit) from being caused to retreat by wind pressure in the case of the configuration that receives the wind pressure that acts in the retreat direction along with travelling of the vehicle.

Therefore, it is possible to achieve a vehicle exterior environment imaging system that is capable of maintaining a stable field of view during travelling of the vehicle.

Further, the imaging unit support apparatus according to the embodiment includes the biasing portion (the biasing member 10 or 35) that biases the supporting portion in the retreat direction, and the supporting portion is driven in the retreat direction on the basis of the biasing force by the biasing portion in response to the release of locking by the locking mechanism.

Accordingly, it is possible to drive the supporting portion in the retreat direction by a drive force larger than the input drive force along with the collision in response to the unlocking.

Specifically, it is possible to cause the supported portion to retreat with a larger acceleration when the unlocking is performed in response to the collision.

Therefore, it is possible to reduce the impact given to a collision object such as a person, and improve the safety of the collided object.

Further, when an operation of causing the supported portion to move to the retreat position is referred to as the retreat operation, the imaging unit support apparatus according to the embodiment includes the change suppression mechanism (the vehicle side connection portions 5 and 6, the supported portion side connection portions 7 and 8, the front side member 27, the rear side member 28, the fan-shaped members 29 and 30, and the circular-shaped member 31) that suppresses the change in the direction of imaging performed by the imaging unit in the retreat operation.

Accordingly, it is possible to maintain the visual field range after the retreat to a range similar to that before the retreat.

Therefore, it is possible to suppress the change in the imaging field of view before and after the retreat, and improve the safety on the vehicle operation.

Further, in the imaging unit support apparatus according to the embodiment, the supporting portion includes at least one supporting member (the front side supporting member 4*f* or the rear side supporting member 4*b*) that supports the supported portion, and when the drive direction of the supporting portion that causes the supported portion to move to the retreat position is referred to as the retreat direction, the holding portion includes the vehicle side connection portion (5 or 6) that connects one end portion of the supporting member to the vehicle so that the supporting member can pivot in the retreat direction with the axial member (5*a* or 6*a*) located at the one end portion as a pivot shaft and the supported portion side connection portion (7, 8, 7', or 8') that connects the other end of the supporting member to the supported portion so that the supported portion can pivot in the pivot direction opposite to the retreat direction with the axial member (7*a*, 8*a*, 7'*a*, or 8'*a*) located at the other end portion as a pivot shaft.

Then, the change suppression mechanism is a mechanism in which the supporting member pivots in the retreat direction and the supported portion pivots in the pivot direction opposed to the retreat direction in synchronization with each other.

According the above-mentioned configuration, the pivot of the supported portion for suppressing the change in the imaging direction is mechanically (automatically) performed in synchronization with the operation of causing the supporting member to retreat.

Therefore, it does not need to provide a dedicate power source for causing the supported portion to pivot in order to suppress the change in imaging direction, and thus, it is possible to reduce the number of components and the cost.

Further, when an operation of causing the supported portion to move to the retreat position is referred to as the retreat operation, the imaging unit support apparatus according to the embodiment includes the direction control mechanism (the curved portions 4*fx* and 4*bx*, and the regulation portion 100*s*) that changes the orientation of the direction of imaging performed by the imaging unit at the time when the retreat operation is finished to the orientation that moves away from the vehicle.

Accordingly, it is possible to prevent the entire imaging field of view from being blocked by the vehicle even if the retreat operation in which the supported portion is caused to retreat in the vehicle is performed.

Therefore, it is possible to improve the safety by reducing the amount of external projection of the retreated supported portion from the vehicle and ensure the field of view outside the vehicle after the retreat of the supported portion at the same time.

Further, the imaging unit support apparatus according to the embodiment includes the drive unit (the driven unit 4*fa* and the motor 22) that drives the supporting portion in the direction for causing the supported portion to move from the retreat position to the normal position.

By the above-mentioned drive unit, it is possible to return the retreated supported portion to the normal position.

Therefore, it is possible to reduce the trouble of returning the supported portion to the normal position in a manual operation performed by a crew when the supported portion retreats in response to collision, and thus to reduce the burden.

Further, in the imaging unit support apparatus according to the embodiment, the supporting portion projects toward the side of the vehicle when the supported portion is located at the normal position, and includes the cover portion (9 or 9A) for the supporting portion and the supported portion. A part of the cover portion is located in front of the supporting portion and the supported portion.

Accordingly, it is possible to prevent impact along with collision from the front of the vehicle from being directly input to the supporting portion and the supported portion (the imaging unit). Therefore, it is possible to prevent the supporting portion and the imaging unit from being damaged/destroyed by the collision.

Further, in the imaging unit support apparatus according to the embodiment, the cover portion includes a rectification unit (the upper surface 9*u* and the lower surface 9*d*) that rectifies the airflow generated during the travelling of the vehicle.

By the above-mentioned rectification unit, it is possible to reduce wind noise along with travelling of the vehicle, and the drive force in the retreat direction applied to the supporting portion by wind pressure along with travelling of the vehicle.

Therefore, it is possible to improve the crew comfort, and prevent the retreat operation of the imaging unit from being performed unnecessarily by wind pressure along with travelling of the vehicle.

Further, the imaging unit support apparatus in the embodiment, the front end portion of the cover portion is formed of an elastic material.

By the above-mentioned elastic material, an effect of reducing impact on a collision object that collides from the front of the vehicle such as a person is obtained, and also an effect of reducing impact on the supporting portion and the supported portion (the imaging unit) located behind the cover portion is obtained.

Therefore, it is possible to improve the safety of a collided object, and increase the effect of preventing the supporting portion and the imaging unit from being damaged/destroyed by collision.

Further, the imaging unit support apparatus according to the embodiment includes the light emitting portion (3Ab). Light is emitted from a part of the light emitting portion on the outer periphery of the imaging unit.

Accordingly, it is possible to demonstrate the existence of the supported portion located outside the vehicle for a person around the vehicle.

Therefore, it is possible to prevent collision with the supported portion.

Further, in the imaging unit support apparatus according to the embodiment, the light source of the light emitting portion is located at a position closer to the vehicle than the imaging unit.

Accordingly, it is possible to prevent the size of the supported portion supported by the supporting portion from the side of the vehicle from being increased toward the outside direction of the vehicle.

Specifically, it is possible to reduce the amount of projection of the supported portion from the vehicle, reduce the risk of collision with the supported portion, and prevent advantages of size-reduction from the rear-view mirror from being reduced.

Further, the imaging unit support apparatus according to the embodiment includes the transparent member. A light beam enters the transparent member from the light source of the light emitting portion. The light beam that is totally reflected on the interface of the transparent member is transmitted through the transparent member, and guided to the light emitting portion.

Accordingly, it is possible to cause light that is guided in the transparent member and has directionality to be emitted from the light emitting portion. Further, because light from the light source can be guided in the transparent member, the degree of freedom of the placement position of the light source is improved, which makes it easier to place the light source at a position closer to the vehicle than the imaging nit.

Further, the imaging unit support apparatus according to the embodiment includes the switching mechanism that switches the light emission state of the light emitting portion in synchronization with the movement of the supporting portion.

Accordingly, it does not need to place the burden of the operation of switching the light emission state of the light emitting portion on a crew such as a driver.

Therefore, it is possible to reduce the operation burden on a crew during the vehicle operation.

Various embodiments are described herein with at least some of the embodiments being described below (1) A dynamically deployable side-view camera mount, including:
  a support body having a proximal end that attaches to a motorized vehicle, and a distal end that connects to a side-view camera, and the support body is mounted such that
  when the support body is in a deployed position, the distal end is positioned away from the motorized vehicle, and an image scene captured by the side-view camera is from a rearward perspective with respect to a forward-moving direction of the motorized vehicle, the image scene spanning an angular range, and
  when the support body is in a retracted position, the distal end of the support body is positioned closer to the motorized vehicle than when the support body is in the deployed position, and the side-view camera is positioned to at least partially include the angular range captured by the side-view camera when the support body is in the deployed position.

(2) The dynamically deployable side-view camera mount according to (1), further including:
  a retraction device comprising a biasing member that, in response to a contact force on the support body and/or side-view camera, applies a retraction force that urges the support body toward the motorized vehicle to the retracted position.

(3) The dynamically deployable side-view camera mount according to (1), wherein:
  the support body includes two support arms arranged in parallel and interconnected at respective ends thereof with support links attached at pivot points so the two support arms remain substantially in parallel when in the deployed position and when in the retracted position.

(4) The dynamically deployable side-view camera mount according to (3), wherein:
  an optical axis of the side-view camera when the support body is in the deployed position not being parallel to the optical axis of the side-view camera when the support body is in the retracted position.

(5) The dynamically deployable side-view camera mount according to (4), wherein:
  at least a part of the support body is configured to rest within a recessed portion of a body of the motorized vehicle when the support body is in the retracted position.

(6) The dynamically deployable side-view camera mount according to (1), wherein:
  the support body includes a plurality of meshed gear plates that rotate relative to one another when the support body is moved between the deployed position and the retracted position.

(7) The dynamically deployable side-view camera mount according to (2) wherein:
  the support body includes an extendable arm attached to the biasing member that is connected at one end to the support body and to the motorized vehicle at the other end so as to exert a retraction force on the support body when the support body is in the retracted position or the deployed position.

(8) The dynamically deployable side-view camera mount according to (1), further including:
  a first motor configured to respond to a user-initiated control signal to deploy the support body and/or retract the support body.

(9) The dynamically deployable side-view camera mount according to (1), further including:
  a lock that keeps the support body in the deployed position if a torque generated by the contact force is less than a predetermined torque, but permits the support body to move to the retracted position if the torque is greater than the predetermined torque.

(10) The dynamically deployable side-view camera mount according to (1), further including:
  a second motor configured to move the side-view camera to a first user-selectable preset position when the support body is in the deployed position, and move the side-view camera to a second user-selectable preset position when the support body is in the retracted position.

(11) The dynamically deployable side-view camera mount according to (1), further including:
a cover disposed on the support body on an opposite side of the side-view camera so as to avoid blocking the image scene captured by the side-view camera.

(12) The dynamically deployable side-view camera mount according to (11), wherein the cover includes a fin that reduces wind loading on the support body and side-view camera when the motorized vehicle is moving in the forward-moving direction.

(13) The dynamically deployable side-view camera mount according to (11), wherein the cover comprises an elastic material.

(14) A dynamically deployable side-view camera system, including:
a side-view camera; and
a side-view camera mount comprising
a support body having a proximal end that attaches to a motorized vehicle, and a distal end that connects to a side-view camera mounted such that
when the support body is in a deployed position, the distal end is positioned away from the motorized vehicle, and an image scene captured by the side-view camera is from a rearward perspective with respect to a forward-moving direction of the motorized vehicle, the image scene spanning an angular range, and
when the support body is in a retracted position, the distal end of the support body is positioned closer to the motorized vehicle than when the support body is in the deployed position, and the side-view camera is positioned to at least partially include the angular range captured by the side-view camera when the support body is in the deployed position.

(15) The dynamically deployable side-view camera system according to (14), further including:
a retraction device comprising a biasing member that, in response to a contact force on the support body and/or side-view camera, applies a retraction force that urges the support body toward the motorized vehicle to the retracted position.

(16) The dynamically deployable side-view camera system according to (14), further including:
a light source disposed on the support body or the side-view camera.

(17) The dynamically deployable side-view camera system according to (16), wherein
the light source is configured to have a different emission state when the support is in the deployed state than when in the retracted state.

(18) The dynamically deployable side-view camera system according to (15), further including:
a motor configured to controllably retract the support body to the retracted position.

(19) The dynamically deployable side-view camera system according to (18), further including:
a sensor that is supported by the distal end of the support body and oriented to the forward-moving direction, and
a processor configured to identify an object approaching the sensor and actuates the motor to retract the support body to avoid the object striking the support body and/or side-view camera.

(20) The dynamically deployable side-view camera system according to (19) wherein:
the sensor is a forward-view camera configured to capture a forward-looking scene; and
the processor configured to identify an object in the forward-looking scene approaching the forward-view camera.

(21) A vehicle including:
a dynamically deployable side-view camera system, including
a side-view camera,
a support body having a proximal end that attaches to a motorized vehicle, and a distal end that connects to a side-view camera mounted such that
when the support body is in a deployed position, the distal end is positioned away from the motorized vehicle, and an image scene captured by the side-view camera is from a rearward perspective with respect to a forward-moving direction of the motorized vehicle, the image scene spanning an angular range, and
when the support body is in a retracted position, the distal end of the support body is positioned closer to the motorized vehicle than when the support body is in the deployed position, and the side-view camera is positioned to at least partially include the angular range captured by the side-view camera when the support body is in the deployed position; and
a display mounted to a control panel of the motorized vehicle and configured to display the image scene captured by the side-view camera.

(22) The vehicle according to (21), further including:
another side-view camera, and
another support body attached at a proximal end thereof to the other side of the motorized vehicle, and connected to the another side-view camera at a distal end thereof;
wherein the display being configured to display another image scene captured by the another side-view camera from a different rearward perspective than the image scene captured by the side-view camera.

(1a)
An imaging unit support apparatus, including:
a supported portion, an imaging unit being placed on the supported portion;
a supporting portion that supports the supported portion; and
a holding portion that displaceably holds the supporting portion from a side of a vehicle so that the supported portion is caused to move between a normal position and a retreat position, the normal position being relatively away from the vehicle, the retreat position being relatively close to the vehicle, in which
the supported portion is caused to move from the normal position to the retreat position by driving of the supporting portion in response to collision of an object or as an operation of avoiding the collision when the supported portion is located at the normal position.

(2a)
The imaging unit support apparatus according to (1a) above, further including
a locking mechanism that locks movement of the supporting portion in a retreat direction, the retreat direction being a drive direction of the supporting portion that causes the supported portion to move to the retreat position.

(3a)
The imaging unit support apparatus according to (2a) above, further including a biasing portion that biases the supporting portion in the retreat direction, in which
the supporting portion is driven in the retreat direction by a biasing force applied by the biasing portion in response to release of the locking by the locking mechanism.

(4a)
The imaging unit support apparatus according to any one of (1a) to (3a) above, further including
a change suppression mechanism that suppresses a change in a direction of imaging performed by the imaging unit during a retreat operation, the retreat operation being an operation of causing the supported portion to move to the retreat position.

(5a)
The imaging unit support apparatus according to (4a) above, in which
the supporting portion includes at least one supporting member that supports the supported portion,
the holding portion includes
a vehicle side connection portion that connects one end portion of the supporting member to the vehicle so that the supporting member is capable of pivoting in a retreat direction with an axial member located at the one end portion as a pivot shaft, and
a supported portion side connection portion that connects the other end of the supporting member to the supported portion so that the supported portion is capable of pivoting in a pivot direction opposite to the retreat direction with an axial member located at the other end portion as a pivot shaft, the retreat direction being a drive direction of the supporting portion that causes the supported portion to move to the retreat position, and
the change suppression mechanism causes the supporting member to pivot in the retreat direction and the supported portion to pivot in the pivot direction opposite to the retreat direction in synchronization with each other.

(6a)
The imaging unit support apparatus according to any one of (1a) to (5a) above, further including
a direction control mechanism that changes an orientation of a direction of imaging performed by the imaging unit at the time when a retreat operation is finished to an orientation that moves away from the vehicle, the retreat operation being an operation of causing the supported portion to move to the retreat position.

(7a)
The imaging unit support apparatus according to any one of (1a) to (6a) above, further including
a drive unit that drives the supporting portion in a direction for causing the supported portion to move from the retreat position to the normal position.

(8a)
The imaging unit support apparatus according to any one of (1a) to (7a) above, in which
the supporting portion
projects toward a side of the vehicle when the supported portion is located at the normal position, and includes a cover portion for the supporting portion and the supported portion, a part of the cover portion being located in front of the supporting portion and the supported portion.

(9a)
The imaging unit support apparatus according to (8a) above, in which
the cover portion includes a rectification unit that rectifies airflow generated during travelling of the vehicle.

(10a)
The imaging unit support apparatus according to (8a) or (9a) above, in which
a front end portion of the cover portion is formed of an elastic material.

(11a)
The imaging unit support apparatus according to any one of (1a) to (10a) above, further including
a light emitting portion, light being emitted from a part of the light emitting portion on an outer periphery of the imaging unit.

(12a)
The imaging unit support apparatus according to (11a) above, in which
a light source of the light emitting portion is located at a position closer to the vehicle than the imaging unit.

(13a)
The imaging unit support apparatus according to (11a) or (12a) above, further including
a transparent member, a light beam entering the transparent member from the light source of the light emitting portion, in which
the light beam that is totally reflected on an interface of the transparent member is transmitted through the transparent member and guided to the light emitting portion.

(14a)
The imaging unit support apparatus according to any one of (11a) to (13a) above, further including
a switching mechanism that switches a light emission state of the light emitting portion in synchronization with movement of the supporting portion.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 1,1A,1B,1C,1D Imaging unit support apparatus
2 Imaging unit
3,3A Supported portion
4 Supporting portion
4f Front side supporting member
4fa Driven unit
4fx Curved portion
4b,4bA Rear side supporting member
4bx Curved portion
5,6 Vehicle side connection unit
7,8,7',8' Supported portion side connection portion
5a,6a,7a,8a Axial member
9 Cover portion
9f Cover front portion
9b Cover rear portion
9u Upper surface
9d Lower surface
9m Locking portion
10,35 Biasing member
11,11A Unlocking member
11a Slope
22 Motor
27 Front side member
28 Rear side member
29,30 Fan-shaped member 31 Circular-shaped member
36 Locking member
37 Regulation portion
41 Locking and unlocking portion
3Ab Light emitting portion
46 Trigger member

The invention claimed is:

1. A dynamically deployable side-view camera mount, comprising:
a support body having a proximal end that attaches to a motorized vehicle, and a distal end that connects to a side-view camera, wherein
the support body includes two support arms arranged in parallel and interconnected at respective ends via support links attached at pivot points, so the two support arms remain in parallel when in a deployed position and when in a retracted position, and
the support body is mounted such that:
when the support body is in the deployed position, the distal end is positioned away from the motorized vehicle, and an image scene captured by the side-view camera is from a rearward perspective with respect to a forward-moving direction of the motorized vehicle, wherein the image scene-spans an angular range, and
when the support body is in the retracted position, the distal end of the support body is positioned closer to the motorized vehicle than when the support body is in the deployed position, and the side-view camera is positioned to at least partially include the angular range captured by the side-view camera when the support body is in the deployed position.

2. The dynamically deployable side-view camera mount according to claim 1, further comprising a retraction device comprising a biasing member that, in response to a contact force on at least one of the support body or the side-view camera, is configured to apply a retraction force that urges the support body toward the motorized vehicle to the retracted position.

3. The dynamically deployable side-view camera mount according to claim 1, wherein an optical axis of the side-view camera when the support body is in the deployed position is not parallel to the optical axis of the side-view camera when the support body is in the retracted position.

4. The dynamically deployable side-view camera mount according to claim 3, wherein at least a part of the support body is configured to rest within a recessed portion of a body of the motorized vehicle when the support body is in the retracted position.

5. The dynamically deployable side-view camera mount according to claim 1, wherein the support body includes a plurality of meshed gear plates configured to rotate relative to one another when the support body is moved between the deployed position and the retracted position.

6. The dynamically deployable side-view camera mount according to claim 2, wherein the support body includes an extendable arm attached to the biasing member that is connected at one end to the support body and to the motorized vehicle at other end so as to exert the retraction force on the support body when the support body is in the retracted position or the deployed position.

7. The dynamically deployable side-view camera mount according to claim 1, further comprising a first motor configured to respond to a user-initiated control signal to at least one of deploy the support body or retract the support body.

8. The dynamically deployable side-view camera mount according to claim 1, further comprising a lock configured to keep the support body in the deployed position if a torque generated by a contact force is less than a predetermined torque, but permits the support body to move to the retracted position if the torque is greater than the predetermined torque.

9. The dynamically deployable side-view camera mount according to claim 1, further comprising a second motor configured to move the side-view camera to a first user-selectable preset position when the support body is in the deployed position, and move the side-view camera to a second user-selectable preset position when the support body is in the retracted position.

10. The dynamically deployable side-view camera mount according to claim 1, further comprising a cover disposed on the support body on an opposite side of the side-view camera so as to avoid blocking the image scene captured by the side-view camera.

11. The dynamically deployable side-view camera mount according to claim 10, wherein the cover includes a fin configured to reduce wind loading on the support body and the side-view camera when the motorized vehicle is moving in the forward-moving direction.

12. The dynamically deployable side-view camera mount according to claim 10, wherein the cover comprises an elastic material.

13. A dynamically deployable side-view camera system, comprising:
a side-view camera; and
a side-view camera mount, comprising:
a support body having a proximal end that attaches to a motorized vehicle, and a distal end that connects to the side-view camera, wherein
the support body includes two support arms arranged in parallel and interconnected at respective ends via support links attached at pivot points, so the two support arms remain in parallel when in a deployed position and when in a retracted position,
the support body is mounted such that:
when the support body is in the deployed position, the distal end is positioned away from the motorized vehicle, and an image scene captured by the side-view camera is from a rearward perspective with respect to a forward-moving direction of the motorized vehicle, wherein the image scene spans an angular range, and
when the support body is in the retracted position, the distal end of the support body is positioned closer to the motorized vehicle than when the support body is in the deployed position, and the side-view camera is positioned to at least partially include the angular range captured by the side-view camera when the support body is in the deployed position.

14. The dynamically deployable side-view camera system according to claim 13, further comprising a retraction device comprising a biasing member that, in response to a contact force on at least one of the support body or the side-view camera, is configured to apply a retraction force that urges the support body toward the motorized vehicle to the retracted position.

15. The dynamically deployable side-view camera system according to claim 13, further comprising a light source disposed on the support body or the side-view camera.

16. The dynamically deployable side-view camera system according to claim 15, wherein the light source is configured to have a different emission state when the support body is in the deployed position than when in the retracted position.

17. The dynamically deployable side-view camera system according to claim 14, further comprising a motor configured to controllably retract the support body to the retracted position.

18. The dynamically deployable side-view camera system according to claim 17, further comprising:
   a sensor that is supported by the distal end of the support body and oriented to the forward-moving direction; and
   a processor configured to identify an object approaching the sensor and actuates the motor to retract the support body to avoid the object striking at least one of the support body or the side-view camera.

19. The dynamically deployable side-view camera system according to claim 18, wherein:
   the sensor is a forward-view camera configured to capture a forward-looking scene; and
   the processor is further configured to identify the object in the forward-looking scene approaching the forward-view camera.

20. An apparatus, comprising:
   a dynamically deployable side-view camera system including a first side-view camera;
   a first support body having a proximal end that attaches to a motorized vehicle, and a distal end that connects to the first side-view camera, wherein
      the first support body includes two support arms arranged in parallel and interconnected at respective ends via support links attached at pivot points, so the two support arms remain in parallel when in a deployed position and when in a retracted position, and
      the first support body is mounted such that:
         when the first support body is in the deployed position, the distal end is positioned away from the motorized vehicle, and an image scene captured by the first side-view camera is from a rearward perspective with respect to a forward-moving direction of the motorized vehicle, wherein the image scene spans an angular range, and
         when the first support body is in the retracted position, the distal end of the first support body is positioned closer to the motorized vehicle than when the first support body is in the deployed position, and the first side-view camera is positioned to at least partially include the angular range captured by the first side-view camera when the first support body is in the deployed position; and
   a display mounted to a control panel of the motorized vehicle, wherein the display is configured to display the image scene captured by the first side-view camera.

21. The apparatus according to claim 20, further comprising:
   a second side-view camera; and
   a second support body attached at the proximal end thereof to another side of the motorized vehicle, and connected to the second side-view camera at the distal end thereof,
wherein the display is configured to display another image scene captured by the second side-view camera from a different rearward perspective than the image scene captured by the first side-view camera.

* * * * *